United States Patent Office 3,732,209
Patented May 8, 1973

3,732,209
NOVEL 17β-OXYGENATED CYCLOPROPA(16α,17α) STEROIDS
Kenneth Earl Fahrenholtz, Bloomfield, and Richard Wightman Kierstead, North Caldwell, N.J., assignors to Hoffmann-La Roche Inc., Nutley, N.J.
No Drawing. Filed Mar. 15, 1971, Ser. No. 124,589
Int. Cl. C07c 173/00
U.S. Cl. 260—239.5         17 Claims

ABSTRACT OF THE DISCLOSURE

Novel 17β-oxygenated steroids having a fused cyclopropyl or halogenated cyclopropyl ring at the 16α,17α-positions are useful as hormonal agents, particularly as androgenic and anabolic agents.

BRIEF DESCRIPTION OF THE INVENTION

The present invention primarily relates to a series of compounds depicted by the following formula

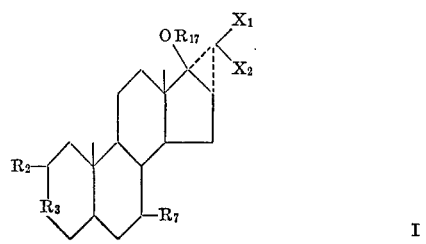

I where $X_1$ and $X_2$ are each independently hydrogen or a halogen selected from the group consisting of fluorine, chlorine and bromine; $R_{17}$ is hydrogen, lower alkyl, cycloalkyl or acyl; $R_2$ taken independently is hydrogen; $R_3$ taken independently represents 3-hydroxy and 3-hydroxyl-$\Delta^5$, and the acyl, lower alkyl, aryl-lower alkyl and cycloalkl derivatives thereof, 3-keto, 3-keto-$\Delta^1$, 3-keto-$\Delta^4$, 3-keto-$\Delta^{1,4}$, 3-keto-$\Delta^{4,6}$ and 3-keto-$\Delta^{1,4,6}$; $R_2$ and $R_3$ taken together with carbon atom 2 of the steroid nucleus form a 5-membered heteroaromatic ring wherein one heteroatom is attached to carbon atom 3 which may additionally contain $\Delta^4$ or $\Delta^{4,6}$ unsaturation; and $R_7$ is hydrogen, acyl thio, lower alkyl thio or mercapto.

As used throughout the specification and the appended claims, the term "acyl group" shall mean a group which contains the residue of a saturated or unsaturated aliphatic, cycloaliphatic, araliphatic or aromatic carboxylic acid containing up to 20 carbon atoms obtained by removing the hydroxyl from the carboxyl moiety. Examples of such acids include formic acid, acetic acid, propionic acid, palmitic acid, stearic acid, succinic acid, malonic acid, citric acid and benzoic acid.

The term "alkoxy group" includes groups containing up to 20 carbon atoms which may be aliphatic, cycloaliphatic or araliphatic in nature. Examples of such alkoxy groups include methoxy, ethoxy, propoxy, butoxy, tertiary butoxy, cyclopentyloxy, cyclohexyloxy and benzyloxy. The term "alkyl group" comprehends a straight or branched chain hydrocarbon group containing no unsaturation and having up to 20 carbon atoms; the term "cycloalkyl group" denotes a saturated hydrocarbon group possessing at least one carbocyclic ring, said ring containing from three to eight carbon atoms. The term "lower" as applied to any of the foregoing groups denotes a group having a carbon skeleton containing up to and including 8 carbon atoms. The term "heteroaromatic ring" comprehends a ring system containing aromatic unsaturation and which has at least one ring member which is not a carbon atom.

In the formulae presented herein, the various substituents on cyclic compounds are joined to the cyclic nucleus by one of three notations, a solid line (—) indicating a substituent which is in the β-orientation (i.e., above the plane of the paper), a dotted line (- - -) indicating a substituent which is in the α-orientation (i.e., below the plane of the paper) or a wavy line (∼) indicating a substituent which is in either the α- or the β-orientation. Although the position of the angular methyl group at carbon atom 13 of the steroid nucleus has been arbitrarily indicated as the β-orientation, i.e., the "natural" steroid series, the invention is not to be construed as limited to the "natural" steroid series and is meant to include the corresponding "unnatural" and racemic steroid series.

Preferred compounds of Formula I are those wherein $X_1$ and $X_2$ are both hydrogen or both fluorine; $R_{17}$ is acetyl, propionyl, methyl, ethyl and propyl; $R_7$ is hydrogen; $R_2$ is hydrogen and $R_3$ is 3-keto, 3-keto-$\Delta^1$ or 3-keto-$\Delta^4$; and $R_2$ and $R_3$ taken together with carbon atom 2 of the steroid nucleus form an isoxazole ring.

Compounds of the genus represented by Formula I may be prepared in a number of ways. Generally, it is preferred to convert compounds of Formula II to the subgeneric compounds of Formula Ia:

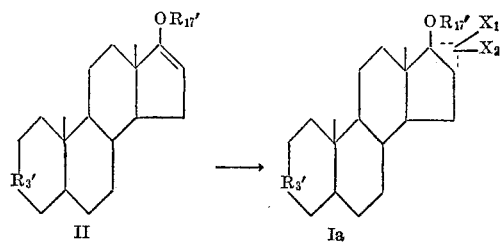

where $R_3'$ is 3-hydroxyl, 3-hydroxyl-$\Delta^5$ and the acyl, lower alkyl, aryl lower alkyl and cycloalkyl derivatives thereof; $R_{17}'$ is acyl, lower alkyl or cycloalkyl and $X_1$ and $X_2$ are as above.

These compounds of Formula Ia can then be further converted to the remaining members of the genus.

Compounds of Formula II are prepared starting with readily available 3-hydroxy-17-keto steroids (referred to as hydroxy ketones), e.g., isoandrosterone, 3-hydroxy-androst-5-en-17-one, etc. In one procedure, the hydroxy ketones can be treated with an enol-acylating agent such as, for example, isopropenyl acetate in the presence of a strong acid, such as a mineral acid or an organic sulfonic acid. In this manner, the free hydroxyl group at carbon atom 3 is acylated and the ketone at carbon atom 17 is converted to its enol acylate.

Alternatively, the hydroxy ketone can be converted to the corresponding 17,17-dialkyl ketal by reaction with a ketalizing agent, such as a trialkylorthoformate, for example, trimethyl orthoformate or tiethylorthoformate, in the presence of a mineral acid or organic sulfonic acid. Elimination of alcohol by heating with strong acid affords the 17-enol ether. If desired, the 3-hydroxyl group can be esterified prior to this reaction in the normal manner by treatment with an acylating agent, e.g., acetic anhydride or acetylchloride, in the presence of a base, e.g., pyridine, or etherified by reaction with an alkylating agent as described below.

The hydroxy ketones can be converted to 3-ether-17-ketones by reaction with an alkylating agent such as, for example, methyl iodide or benzyl chloride in the presence of a strong base such as, for example, an alkali metal hydride and the like. The 17-ketone can then be converted to its enol ester derivative by utilizing an enol acylating agent as described above. It may be desirable to first protect the 17-ketone group by conversion to a conventionally hydrolyzable ketal group in the normal manner.

This protecting group can be removed after etherification of the 3-hydroxyl group.

The conversion of compounds of Formula II to compounds of Formula Ia is accomplished by well known methods for adding a methylene or halomethylene group across a double bond to afford a cyclopropyl or halocyclopropyl fused ring system. For introduction of a methylene group, one reacts compounds of Formula II with a reactive dihalomethane, such as diiodomethane or dibromomethane, in the presence of a zinc reagent, e.g., a zinc-copper couple or a dialkyl zinc, in an inert solvent, preferably an ether or dichloromethane. The reaction proceeds stereospecifically to afford the cyclopropa-[16α,17α]steroids of Formula Ia where $X_1$ and $X_2$ are hydrogen.

For introduction of a halocyclopropane ring, one adds to the 16,17-double bond a monohalo or dihalocarbene, which is generated in situ by a number of well known techniques. For example, difluorocarbene can be prepared in situ by pyrolysis of the sodium salt of chlorodifluoroacetic acid, preferably in a heated solution of an inert organic ether such as, for example, diethylene glycol dimethyl ether. The difluorocarbene thus generated reacts in situ with the steroid of Formula II to afford compounds of Formula Ia wherein $X_1$ and $X_2$ are fluorine.

Methods for preparing monochlorocarbene, dichlorocarbene, monobromocarbene and dibromocarbene are also well known. One method is to generate these carbenes in situ by treatment of the appropriately substituted di- or trihalomethane such as, for example, chloroform, bromoform, methylene dichloride or methylene dibromide with a strong base such as, for example, potassium tertiary butoxide. Another method is to prepare the carbene from an appropriately substituted organomercury compound such as phenylmercuric trichloromethane. The carbenes generated in the above described manner, react with the steroid of Formula II to afford a compound of Formula Ia wherein $X_1$ and $X_2$ may be hydrogen, chlorine or bromine.

Compounds of Formula Ia where $R_3'$ is not hydroxyl may be converted to compounds of Formula Ib shown below

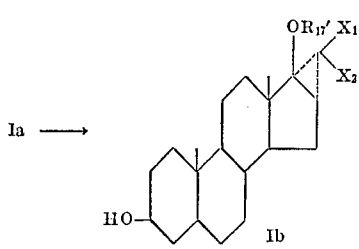

where $X_1$, $X_2$ and $R_{17}'$ are as above, and its $\Delta^5$-derivatives; by a number of different methods.

Where $R_{17}'$ is acyl and $R_3'$ is 3-acyloxy or 3-acyloxy-$\Delta^5$, the ester group at carbon atom 3 can be selectively hydrolyzed to the hydroxyl group by treatment with an aqueous base such as an alkali metal carbonate or alkali metal bicarbonate. Alternatively, the selective hyrolysis may be carried out by treatment of compounds Ia with dilute aqueous mineral acid, for example, dilute hydrochloric acid. Another method to selectively hydrolyze the ester group at C-3 is by adsorption of a steroid of Formula Ia on an activated surface, for example, activated alumina.

Where there is benzyloxy or substituted benzyloxy in the 3-position, this group may be hydrogenolyzed to the hydroxyl group under conventional hydrogenolysis conditions, i.e., hydrogen in the presence of a metal catalyst. Of course, if a $\Delta^5$-double bond is present, this will also be reduced. Where $R_3'$ is 3-acyloxy or 3-acyloxy-$\Delta^5$ and $R_{17}'$ is lower alkyl or cycloalkyl, the ester group at C-3 may be selectively hydrolyzed to the hydroxyl group by treatment with, for example, an aqueous or alcoholic base such as an alkali metal hydroxide or carbonate. The C-3 ester group can also be selectively removed by reduction with a metal hydride reducing agent such as lithium aluminum hydride.

When there are acyloxy groups at both the 3 and 17-positions, both groups may be hydrolyzed by treatment with aqueous base or aqueous mineral acid to afford the diol of Formula Ic

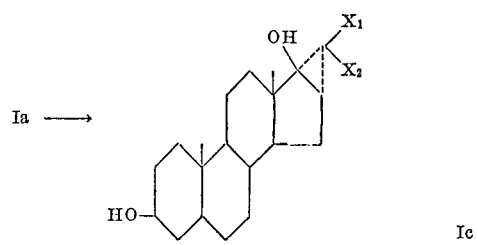

where $X_1$ and $X_2$ are as above, and its $\Delta^5$-derivatives.

Additional methods for removing these groups are by treating a compound of Formula Ia with an organometallic agent, for example, a Grignard reagent, such as tert. butyl magnesium chloride or by reduction with a metal hydride reducing agent such as lithium aluminum hydride.

Compounds of Formula Ib can be oxidized to afford the ketones of Formula Id

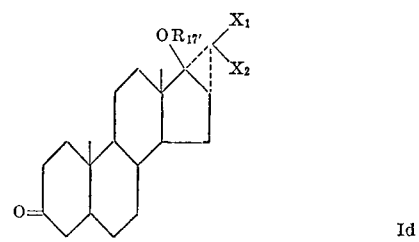

where $X_1$, $X_2$ and $R_{17}'$ are as above, by standard oxidation techniques utilizing oxidizing agents such as, for example, chromium trioxide, potassium dichromate, potassium permanganate and so forth. Jones reagent (chromium trioxide-sulfuric acid) is a preferred reagent. Chromium trioxide-pyridine oxidation is especially preferable when $R_{17}'$ is lower alkyl or cycloalkyl. If desired, where $R_{17}'$ is an acyl or easily hydrolyzable alkyl group such as, for example, tertiary butyl, said group can be hydrolyzed under acidic or basic conditions to afford the compounds of Formula Ie

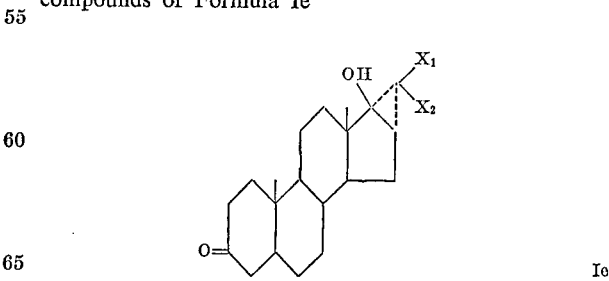

where $X_1$ and $X_2$ are as above.

The hydroxyl group at carbon atom 17 can be reacylated in the conventional manner with a different acylating agent, if desired, to afford back a compound of Formula Id. A compound of Formula Ic can be selectively oxidized to a compound of the Formula Ie by the use of mild oxidizing agents such as dicyclohexylcarbodi-imide-dimethylsulfoxide.

The compounds of Formulas Id and Ie can be converted, using conventional techniques well known in the steroid art, to a wide variety of derivatives. For example, double bonds can be introduced at the 1,2- and/or 4,5- and/or 6,7-positions by well known dehydrogenation techniques employing such dehydrogenating agents as DDQ (2,3-dichloro-5,6-dicyano-1,4-benzoquinone). A $\Delta^1$-double bond so introduced can be selectively reduced in the presence of a $\Delta^4$- or $\Delta^6$-double bond by utilizing a soluble hydrogenation catalyst such as tris-(triphenylphosphine) rhodium chloride in the presence of hydrogen. The $\Delta^{4,6}$- or $\Delta^{1,4,6}$-3-keto steroids can be reacted with nucleophilic reagents, for example, metal salts of acyl thiols, lower alkyl thiols or hydrogen sulfide to afford compounds having a 7-acyl thio, lower alkyl thio or mercapto group, respectively. Additionally, 7-mercapto steroids can be prepared by hydrolysis of the corresponding 7-acyl thio steroids by standard procedures.

These 7-substituted compounds can be further transformed by hydrogenation of double bonds, reduction of the 3-keto group, etc. according to well known procedures.

Other derivatives of compounds of the Formulas Id or Ie can be prepared by standard reactions well known in the art. For example, a compound of Formula Id or Ie can be reacted with hydrazine to afford the 3-hydrazone which can be subsequently disproportionated to afford the dimeric azine.

Compounds of Formula Id or the $\Delta^4$- or $\Delta^{4,6}$-derivatives thereof can be converted to a variety of steroids having a heterocyclic ring fused to the A-ring at the 2,3-positions. One convenient way to accomplish this is to first prepare 2-hydroxymethylene steroids of Formula III (which exist in various tautomeric forms).

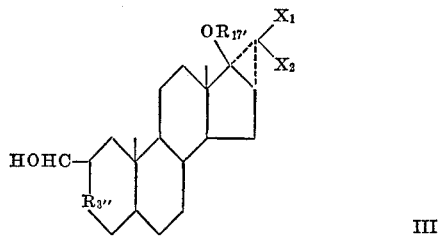

where $R_{17}'$, $X_1$ and $X_2$ are as above, and $R_3''$ is 3-keto, 3-keto-$\Delta^4$ or 3-keto-$\Delta^{4,6}$.

These compounds can be prepared, for example, by condensation of a compound of Formula Id or its $\Delta^4$- or $\Delta^{4,6}$-derivative with an alkyl formate such as ethyl formate, in the presence of base, such as a metal alcoholate. This method is preferred where $R_{17}'$ is lower alkyl or cycloalkyl. When $R_{17}'$ is acyl, it is preferred to treat the 3-ketal of a compound of Formula Id with Vilsmeier reagent (phosphorus oxychloride and N,N-dimethylformamide) followed by cleavage of the 3-protective group under aqueous acidic conditions. The 17-ester can be removed if desired, as detailed above.

Reaction of compounds of Formula III with hydrazine, according to well known procedures, affords androstano-[3,2-c]pyrazoles depicted in structure If.

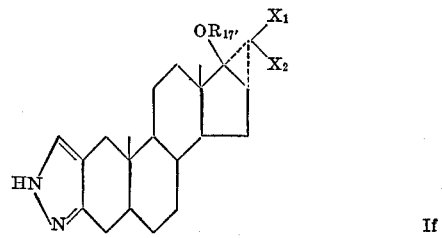

where $R_{17}'$, $X_1$ and $X_2$ are as above and its $\Delta^4$- and $\Delta^{4,6}$-derivatives.

Reaction of compounds of Formula III with hydroxylamine in the presence of acid affords androstano[2,3-d]isoxazoles (Formula Ig) and reaction with hydroxylamine in the presence of base affords androstano[3,2-c]isoxazoles (Formula Ih)

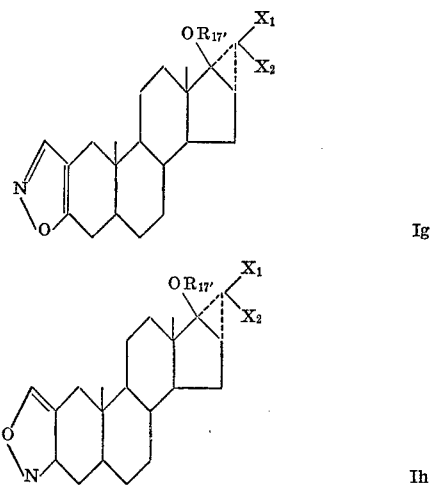

where $R_{17}'$, $X_1$ and $X_2$ are as above, and their $\Delta^4$- and $\Delta^{4,6}$-derivatives.

Other heteroaromatic systems fused to the steroid nucleus at the 2,3-position can be prepared by techniques well known in the steroid art, in an analogous fashion. If desired, the above heteroaromatic compounds, where $R_{17}'$ is acyl, can be converted to the corresponding 17-hydroxy compounds by methods described above.

Another aspect of the present invention concerns the preparation of A-ring aromatic steroids of Formula IV:

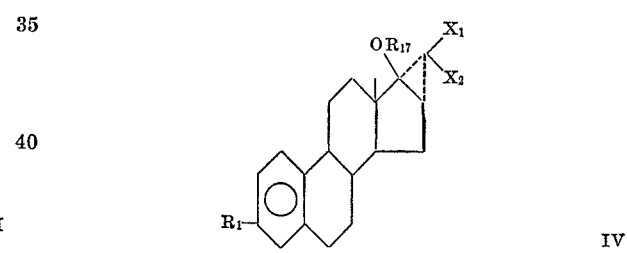

where $R_{17}'$, $X_1$ and $X_2$ are as above, and their $\Delta^4$- and lower alkoxy, aryloxy, aryl lower alkoxy, cycloalkoxy or acyl.

These compounds are prepared in an analogous manner to the compounds of Formula I, described above, by starting with the 17-enol ether or enol ester of a 3-substituted estrone.

The enol ester or enol ether can be converted to the cyclopropa[16α,17α]steroid of Formula IV in the manner described above for compound II, and the protective groups at carbons 3 and 17 can then be hydrolyzed, if desired, as described above.

The compounds of Formulae I and IV exhibit hormonal properties. Compounds of Formula I are characterized by a high degree of anabolic and androgenic activity. Many of the compounds of Formula I exhibit a high degree of separation between the anabolic and androgenic activities, making them particularly useful as anabolic agents. The compounds of Formula IV are characterized by a high degree of estrogenic activity. Compounds of Formulae I and IV can be administered internally, for example, orally or parenterally, with dosages adjusted to individual requirements. An approximate daily dosage for compounds of Formula I in an adult human would be from about 2 to about 20 mg. per day. An approximate daily dosage for a compound of structure IV would be from about 0.2 to about 20 mg. per day. These compounds may be administered in unit or divided dosages to make up the daily dosage regimen. The selection of the specific dosages and dosage regimens should be left to the discretion of a trained medical practitioner.

The above compounds of Formulae I and IV can be administered in the form of conventional pharamaceutical preparations; for example, they can be administered in conventional pharmaceutical solid or liquid forms, such as tablets, pills, capsules, solutions, suspensions, emulsions, or the like. These pharmaceutical preparations can contain conventional pharmaceutical carriers and excipients such as water, talc, corn starch, polyalkylene glycols, emulsifying agents, buffering agents, agents for the adjustment of osmotic pressure, vaseline and the like. The pharmaceutical compositions, described above, can additionally contain other active ingredients.

While it has been shown that novel cyclopropa-[16α,17α]steroids of the androstane and estrane series are useful hormonal agents, the scope of the present invention is not to be construed as limited to these classes of compounds. Thus, other cyclopropa[16α,17α]steroids, e.g., 19-norandrostanes, 18-homoandrostanes, 19-homoandrostanes, 18-homo-19-norandrostanes, 9β,10α-androstanes and the 18 and 19 homo and nor derivatives thereof, 18-homoestranes, gonanes, and so forth, can be prepared by methods described in the present disclosure and analogous methods known in the art.

The following examples serve to further illustrate the practice of the present invention. All temperatures are expressed in degrees centigrade.

EXAMPLE 1

To a solution of 2.90 g. of cupric acetate monohydrate in 290 ml. of acetic acid heated on the steam bath was added 193 g. of granular (20 mesh) zinc. The mixture was stirred for 4 minutes and the liquid was removed by suction. The residue was washed with 290 ml. of hot acetic acid and then three times with 290 ml. of ether at room temperature. The resulting zinc-copper couple was covered with 290 ml. of ether, and with stirring was added a solution of 230.8 g. (0.62 mole) of 5α-androst-16-ene-3β,17β-diol diacetate [J. Am. Chem. Soc., 76, 2943 (1954)] and 163 ml. (540 g., 2.02 moles) of diiodomethane in 580 ml. of dichloromethane in a slow stream. The reaction was stirred and heated under reflux overnight. The organic layer and two dichloromethane washes of the zinc were shaken in a separatory funnel with ice and some 1 N hydrochloric acid. The organic layer and two dichloromethane washes of the aqueous layer were combined, dried, and evaporated to give a colorless crystalline residue. Recrystallization from dichloromethane-ether gave 164 g. (68%) of 3'H-cyclopropa [16α,17α]5α-androstane-3β,17β-diol diacetate, M.P. 185–188°. Further recrystallization gave the analytical sample: M.P. 187–188°;

$$\lambda_{max.}^{CHCl_3} \ 5.75\mu$$

UV in ethanol, only end absorption; NMR in CDCl₃, δ 4.7 (C–3, 1 H br multiplet), 2.05 (diacetate, 6 H singlet), 0.92 (C–19, 3 H singlet), 0.84 (C–18, 3 H singlet); $[\alpha]_D^{25°}$ +5.26° (CHCl₃, c.=1.20).

*Analysis.*—Calcd. for $C_{24}H_{36}O_4$ (percent): C, 74.19; H, 9.34. Found (percent): C, 74.20; H, 9.11.

EXAMPLE 2

A solution of 50.00 g. (0.128 mole) of diacetate prepared as in Example 1 in 500 ml. of tetrahydrofuran was added over 40 minutes with stirring to a slurry of 10.0 g. of lithium aluminum hydride in 500 ml. of ether. The reaction was then heated under reflux for one hour and cooled to room temperature. Saturated sodium sulfate solution was then cautiously added until the gray color had been discharged and the separated inorganic-aqueous layer was quite gummy. The organic layer and a tetrahydrofuran wash of the aqueous residue were combined, dried, and partly concentrated under vacuum. The resulting slurry was diluted with some ether and filtered to give 35.40 g. (90%) of 3'H-cyclopropa [16α,17α]5α-androstane-3β,17β-diol as colorless crystals with a melting point that varies widely with the rate of heating and from one preparation to another; TLC in either 10% methanol in chloroform or 15% ethyl acetate in benzene indicated this material was homogeneous. Further recrystallization from tetrahydrofuran-hexane gave the analytical sample; IR in KBr shows a strong hydroxyl peak and no carbonyl peak; NMR in tetrahydrofuran, δ ~3.5 (C–3, 1 H br multiplet), 0.93 (C–19, 3 H singlet), 0.83 (C–18, 3 H singlet); $[\alpha]_D^{25}$ +10.49° (tetrahydrofuran, c.=1.202).

*Analysis.*—Calcd. for $C_{20}H_{32}O_2$ (percent): C, 76.90; H, 10.59. Found (percent): C, 78.76; H, 10.45.

EXAMPLE 3

To 625 g. of alumina (Matheson, Coleman and Bell, activated, chromatographic grade, 80–200 mesh) wet with benzene was added a solution of 25.0 g. (0.064 mole) of diacetate prepared as in Example 1 in a minimum amount of benzene. The resulting slurry was well mixed and the excess benzene was evaporated under a nitrogen stream. The alumina was again well mixed and then allowed to stand at room temperature. After 24 days the alumina was washed onto a column of 450 g. of alumina wet with benzene. Elution with 50% ether in dichloromethane and ether gave crystalline fractions (7.78 g.). These fractions were recrystallized from ethanol-water to give 2.617 g. of 3'H-cyclopropa [16α,17α]5α-androstane-3β,17β-diol 17-acetate as colorless crystals, M.P. 142.5–144.5°. Further recrystallization from ether gave the analytical sample: M.P. 145.5–146°;

$$\lambda_{max.}^{CHCl_3} \ 5.72\mu$$

UV in ethanol, only end absorption; NMR in CDCl₃, δ 3.54 (C–3, 1 H br multiplet), 2.00 (acetate, 3 H singlet), 0.90 (C–19, 3 H singlet), 0.83 (C–18, 3 H singlet); $[\alpha]_D^{25°}$ +13.57 (CHCl₃, c.=1.157).

*Analysis.*—Calcd. for $C_{22}H_{34}O_3$ (percent): C, 76.26; H, 9.89. Found (percent): C, 76.04; H, 9.65.

EXAMPLE 4

To a solution of 50.00 g. (0.129 mole) of diacetate prepared as in Example 1 in 500 ml. of tetrahydrofuran was added 500 ml. of methanol and 10.0 ml. of conc. hydrochloric acid. The solution was stirred at room temperature and the course of the reaction was followed by TLC. After seven hours the amount of product seemed to be at a maximum and 11 ml. of pyridine was added. The reaction was diluted with 500 ml. of water and the methanol was removed under vacuum. The residue was diluted with more water and the precipitate was collected by filtration, washed well with water and sucked dry. The solid residue was washed with dichloromethane in several portions. The dichloromethane washes were combined and concentrated. The residue was dissolved in benzene and adsorbed onto 230 g. of silica gel. Elution with 10% through 30% ether in dichloromethane gave fractions rich in product which were recrystallized from dichloromethane-methanol to give 12.39 g. of 3'-H-cyclopropa [16α,17α]5α-androstane-3β,17β-diol 17-acetate M.P. 138–142° identical with the material prepared in Example 3.

EXAMPLE 5

A mixture of 98.0 g. (0.293 mole) of 5α-androstan-3β-ol-17-one cyclic ethylene ketal [Bull. Soc. Chim. France, 539 (1940)], 21.0 g. of a 50% dispersion of sodium hydride in mineral oil and 1.00 l. of dimethylsulfoxide was stirred at room temperature for 30 minutes. Sixty-five milliliters of benzyl chloride was added and the reaction was stirred overnight and then poured into 6 l. of ice and water. The resulting precipitate was collected by filtration and dissolved in dichloromethane. The solution was dried and concentrated to leave a colorless crystalline residue. This was recrystallized from dichloromethane-ether to give 95.6 g. (77%) of 3β-benzyloxy-5α-androstan-17-one cyclic ethylene ketal as colorless crystals, M.P. 153.5–155.5°. The analytical sample isolated from dichloromethane-acetone had M.P. 151.5–153.5°;

$\lambda_{max}^{C_2H_5OH}$ 253 mµ (ε 180), 259 (230), and 265 (180)

NMR in CDCl$_3$ δ 7.28 (C$_6$H$_5$, 5 H singlet), 4.54 (C$_6$H$_5$C$\underline{H}_2$—, 2 H singlet), 3.85 (ketal, 4 H singlet), 3.28 (C–3, 1 H multiplet), and 0.83 (C–18 and C–19, 6 H singlet); [α]$_D^{25}$ −15.4° (CHCl$_3$, c.=1.08).

*Analysis.*—Calcd. for C$_{28}$H$_{40}$O$_3$ (percent): C, 79.20; H, 9.50. Found (percent): C, 79.34; H, 9.63.

EXAMPLE 6

A heterogeneous mixture of 102.2 g. (0.24 mole) of benzyl ether prepared as in Example 5, 1200 ml. of methanol and 600 ml. of dichloromethane was heated to boiling on the steam bath and 120 ml. of 3 N hydrochloric acid was added. Boiling was continued, and the reaction became homogeneous within 3 minutes. After a total reaction time of 19 minutes the dichloromethane was removed under vacuum and the residue was diluted with water. The resulting colorless precipitate was collected by filtration and air dried to give 91.2 g. (100%) of 3β-benzyloxy - 5α - androstan-17-one, M.P. 150.5–153.5°. Recrystallization from dichloromethane-methanol gave the analytical sample: M.P. 151.5–154°;

$\lambda_{max}^{CHCl_3}$ 5.77µ; $\lambda_{max}^{C_2H_5OH}$ 253 mµ (ε 200), 259 (240), 265 (200), and 292 (70)

NMR in CDCl$_3$ δ 7.28 (C$_6$H$_5$, 5 H singlet), 4.54

(C$_6$H$_5$C$\underline{H}_2$—,

2 H singlet), 3.28 (C–3, 1 H multiplet), and 0.82 (C–18 and C–19, 6 H singlet); [α]$_D^{25}$ +68.9° (CHCl$_3$, c.=1.04).

*Analysis.*—Calcd. for C$_{26}$H$_{36}$O$_2$ (percent): C, 82.06; H, 9.53. Found (percent): C, 81.80; H, 9.33.

EXAMPLE 7

To a solution of 91.2 g. (0.24 mole) of benzyl ether ketone prepared as in Example 6 in 750 ml. of benzene and 375 ml. of isopropenyl acetate was added a solution of 0.85 ml. of concentrated sulfuric acid in 85 ml. of isopropenyl acetate. The reaction was heated with a gradual distillation of 300 ml. of solvent over 24 hours. Another 500 ml. of benzene was added and an additional 400 ml. of solvent was distilled over 24 hours. The residue was cooled to room temperature and filtered over 30 g. of alumina followed by a dichloromethane wash. Concentration of the eluates gave a pale yellow viscous oil which was dissolved in hexane and absorbed onto a column of 600 g. of silica gel. Elution with 50% and 75% benzene in hexane gave fractions which on crystallization from pentane gave 46.0 g. (44%) of 3β-benzyloxy-5α-androst-16-en-17-ol acetate as colorless crystals M.P. 100–104°. The analytical sample was obtained from ether-pentane: M.P. 100–102°;

$\lambda_{max}^{CHCl_3}$ 5.71µ; $\lambda_{max}^{C_2H_5OH}$ 210 mµ (infl) (ε 14,600), 258 (310), 264 (200), and 268 (infl.) (120)

NMR in CDCl$_3$ δ 7.30 (C$_6$H$_5$, 5 H singlet), 5.45 (C–16, 1 H multiplet), 4.53 (C$_6$H$_5$C$\underline{H}_2$—, 2 H singlet), 3.3 (C–3, 1 H multiplet), 2.12 (OAc, 3 H singlet), 0.85 and 0.80 (C–18 and C–19, two 3 H singlets); [α]$_D^{25}$ +22.3° (CHCl$_3$, c.=0.934).

*Analysis.*—Calcd. for C$_{28}$H$_{38}$O$_3$ (percent): C, 79.58; H, 9.06. Found (percent): C, 79.30; H, 8.96.

EXAMPLE 8

To the zinc-copper couple prepared as in Example 1 from 9.8 g. of granular (20 mesh) zinc and 30 ml. of ether was added over 15 minutes a solution of 6.40 g. (15 mmoles) of benzyl ether enol acetate prepared as in Example 7 in 60 ml. of dichloromethane and 8.43 ml. of diiodomethane. The reaction was stirred and heated under reflux overnight, cooled to room temperature and washed with 100 ml. of saturated ammonium chloride solution. The wash was extracted with dichloromethane and the combined organic layers were washed with water, dried and concentrated. The residual oil was dissolved in pentane and absorbed onto 50 g. of silica gel. Hexane eluted a less polar material and then benzene eluted the desired product. Crystallization from ether-pentane gave 1.67 g. (25%) of 3β-benzyloxy-3'-H-cyclopropa [16α,17α]5α-androstan-17β-ol acetate as colorless crystals, M.P. 111.5–113.5°. Further recrystallization from pentane gave the analytical sample: M.P. 113.5–115.5°;

$\lambda_{max}^{CHCl_3}$ 5.72µ; $\lambda_{max}^{C_2H_5OH}$ 252 mµ (ε 210), 258 (230), and 264 (190)

NMR in CDCl$_3$ δ 7.24 (C$_6$H$_5$, 5 H singlet), 4.47

(C$_6$H$_5$C$\underline{H}_2$—,

2 H singlet); 3.22 (C–3, 1 H multiplet), 1.94 (OAc, 3 H singlet), 0.85 (C–19, 3 H singlet), and 0.77 (C–18, 3 H singlet); [α]$_D^{25}$ +11.9° (CHCl$_3$, c.=0.973).

*Analysis.*—Calcd. for C$_{29}$H$_{40}$O$_3$ (percent): C, 79.77; H, 9.23. Found (percent): C, 79.56; H, 9.38.

EXAMPLE 9

A flask containing 12.4 g. (0.0285 mole) of cyclopropyl steroid prepared as in Example 8, 40 ml. of dichloromethane, 1 l. of ethanol and 1.13 g. of a 10% palladium-on-carbon catalyst was shaken under a hydrogen atmosphere at room temperature and pressure. Within 30 minutes, 0.03 mole of hydrogen had been absorbed and uptake had stopped. Concentration of the catalyst-free solution gave a colorless crystalline residue which on recrystallization from methanol gave 7.77 g. (79%) of 3'-H-cyclopropa [16α,17α]5α-androstane-3β,17β-diol 17-acetate, M.P. 142.5–145.5°.

EXAMPLE 10

A solution of 11.39 g. (0.033 mole) of cyclopropyl steroid prepared as in Example 9 in 500 ml. of acetone was cooled to 3° and Jones' reagent was added dropwise until a definite orange color persisted (14.5 ml. used). Excess isopropanol was added to destroy the excess Jones' reagent and the reaction was filtered through a bed of a filter aid. The filtrate and several acetone washes of the filter aid were mixed with some solid sodium bicarbonate and sodium sulfate. The solution was again filtered through a filter aid, then concentrated. The resulting colorless solid was recrystallized from dichloromethane-ether-hexane to give 9.20 g. (81%) of 3'H-cyclopropa [16α,17α]5α - androstan - 17β-ol-3-one acetate as colorless crystals, M.P. 163.5–167°. Further recrystallization from ether-hexane gave the analytical sample; M.P. 165.5–167°;

$\lambda_{max}^{CHCl_3}$ 5.75 and 5.87µ

UV in ethanol, only end absorption; NMR in CDCl$_3$, δ 2.05 (acetate, 3 H singlet) 1.05 and 0.96 (C–18 and C–19, two 3 H singlets); [α]$_D^{25}$ +35.61° (CHCl$_3$, c.=1.177).

*Analysis.*—Calcd. for C$_{22}$H$_{32}$O$_3$ (percent): C, 76.70; H, 9.36. Found (percent): C, 76.93; H, 9.45.

EXAMPLE 11

To a solution of 7.28 g. (0.024 mole) of cyclopropyl diol prepared as in Example 2 in 36 ml. of dimethyl sulfoxide, 36 ml. of benzene and 1.92 ml. of pyridine was added 0.96 ml. of trifluoroacetic acid followed by a solution of 14.85 g. (0.072 mole) of dicyclohexylcarbodiimide in 20 ml. of benzene. The reaction was stirred at room temperature for 2 days and then washed into a beaker with 600 ml. of ether. A solution of 6.5 g. of oxalic acid in 60 ml. of methanol was added and the mixture was stirred vigorously for 30 minutes and filtered. The filtrate was washed with saturated sodium bicarbonate solution, dried, and concentrated under vacuum without excess heat. The residue was mixed with 60 ml. of pyridine and 30 ml. of acetic anhydride. After standing at room temperature overnight the reaction was poured into 3 l. of ice and water. The resulting oily precipitate was collected by filtration on a bed of a filter-aid and then dissolved in dichloromethane. The solution was dried and concentrated and the residue was adsorbed onto a column of silica gel from benzene. Elution with hexane-benzene mixture and with benzene gave less polar materials and elution with 5% ether in benzene gave 3'H-cyclopropa [16α,17α]5α-androstan-17β-ol-3-one acetate. Recrystallization from dichloromethane-hexane gave 2.00 g., identical with that prepared in Example 10.

EXAMPLE 12

To a solution of 29.60 g. (0.097 mole) of cyclopropyl diol prepared as in Example 2 in 225 ml. of pyridine was added 225 ml. of propionic anhydride and the reaction was stirred at room temperature for 3 days. The reaction was then poured into 5 l. of ice and water and the resulting precipitate was collected by filtration and dissolved in dichloromethane. The solution was washed 3 times with water, dried and passed over a column of 45 g. of silica gel. The eluate was concentrated to give a colorless crystalline residue which on recrystallization from dichloromethane-ether-pentane gave 29.10 g. (72%) of 3'H-cyclopropa [16α,17α]5α-androstane-3β,17β-diol dipropionate, M.P. 154.5–157.5°. Further recrystallization gave the analytical sample M.P. 155.5–157.5°;

$\lambda_{max.}^{CHCl_3}$ 5.79μ

NMR in CDCl$_3$, δ 4.771 (3 H, 1 H broad multiplet), 2.33 (COC$\underline{H}_2$CH$_3$ 4 H quartet, J.=7.5 Hz.), 1.13 (COCH$_2$C$\underline{H}_3$, 6 H triplet, J.=7.5 Hz.), 0.94 and 0.86 (C–19 and C–18, two 3 H singlets); [α]$_D^{25}$+4.79° (CHCl$_3$, c.=1.02.

Analysis.—Calcd. for C$_{26}$H$_{40}$O$_4$ (percent): C, 74.96; H, 9.68. Found (percent): C, 74.71; H, 9.47).

EXAMPLE 13

A solution of 29.1 g. (0.070 mole) of dipropionate prepared as in Example 12 in 291 ml. of tetrahydrofuran, 291 ml. of methanol and 5.82 ml. of concentrated hydrochloric acid was allowed to stand at room temperature for 6 hours and then in the refrigerator for 5 days. The reaction was made essentially neutral with 6.2 ml. of pyridine, concentrated to 100 ml. under vacuum, diluted with 1 l. of water and filtered. The solid was air dried, dissolved in benzene and adsorbed onto a column of Florisil. 2 percent ether in dichloromethane gave fractions rich in product which were combined and recrystallized from dichloromethane-hexane to give 5.68 g. (23%) of 3'H-cyclopropa [16α,17α]5α-androstane-3β,17β-diol 17-propionate as colorless crystals, M.P. 180–182°. Further recrystallization gave the analytical sample of identical M.P.;

$\lambda_{max.}^{CHCl_3}$ 2.77 and 5.75μ

NMR in CDCl$_3$, δ 3.55 (C–3, 1 H broad), 2.27 (CH$_3$C$\underline{H}_2$CO$_2$—, 2 H quartet), 1.11 (C$\underline{H}_3$CH$_2$CO$_2$—, triplet), 0.90 (C–19, 3 H singlet), 0.80 (C–18, 3 H singlet); [α]$_D^{25}$+14.21° (CHCl$_3$, c.=0.9638).

Analysis.—Calcd. for C$_{23}$H$_{36}$O$_3$ (percent): C, 76.62; H, 10.06. Found (percent): C, 76.72; H, 9.99.

EXAMPLE 14

A solution of 5.30 g. (0.0147 mole) of propionate prepared as in Example 13 in 265 ml. of acetone and 35 ml. of tetrahydrofuran was cooled to 2° and treated dropwise with 5.9 ml. of Jones' reagent. Three milliliters of isopropanol was added, the inorganic precipitate was removed by filtration and the solution was treated with a little sodium bicarbonate and dried with sodium sulfate. The solution was concentrated and the residue was crystallized from ether to give 2.88 g. (55%) of 3'H-cyclopropa [16α,17α]5α-androstan-17β-ol-3-one propionate as colorless crystals, M.P. 130.5–133.5°. Further recrystallization from ether-pentane gave the analytical sample; M.P. 131.5–133.5°;

$\lambda_{max.}^{CHCl_3}$ 5.75 and 5.86μ

NMR in CDCl$_3$, δ 1.15 (C$\underline{H}_3$CH$_2$CO$_2$—, triplet J.=8 Hz.), 1.04 and 0.95 (C–18 and C–19, two 3 H singlets); [α]$_D^{25}$+36.00° (CHCl$_3$, c.=0.934).

Analysis.—Calcd. for C$_{23}$H$_{34}$O$_3$ (percent): C, 77.05; H, 9.56. Found (percent): C, 77.17; H, 9.68.

EXAMPLE 15

A solution of 5.16 g. (0.015 mole) of ketoacetate prepared as in Example 10 in 80 ml. of tetrahydrofuran, 20 ml. of water and 3.1 ml. of concentrated hydrochloric acid was allowed to stand at room temperature for 16 days. The solution was poured into 1 l. of ice and water and the resulting precipitate was collected by filtration and dissolved in dichloromethane. The solution was washed with water, dried and concentrated. The crystalline residue was recrystallized from dichloromethane-ether to give 2.257 g. of 3'H-cyclopropa [16α,17α]5α-androstan-17β-ol-3-one homogeneous by TLC in 15% ethyl acetate in benzene. This material was dissolved in 23 ml. of pyridine and 23 ml. of propionic anhydride was added. After standing at room temperature for 3 days the solution was poured into 500 ml. of water. The resulting precipitate was collected by filtration and dissolved in ether. The solution was washed with water, dried and concentrated. The residue was crystallized from ether-pentane and then recrystallized from ether to give 0.89 g. (16.6% overall) of 3'H-cyclopropa [16α,17α]5α-androstan-17β-ol-3-one propionate as colorless crystals, M.P. 129.5–132.5° identical with the material prepared in Example 14.

EXAMPLE 16

A mixture of 3.01 g. (0.0087 mole) of 3'H-cyclopropa [16α,17α]5α-androstan-17β-ol-3-one acetate, 30 mg. of p-toluenesulfonic acid and 6 ml. of ethylene glycol in 200 ml. of benzene was heated under reflux under a Dean-Stark trap for 45 minutes. The cooled solution was washed with a dilute sodium bicarbonate solution, dried and evaporated. The colorless crystalline residue was recrystallized from dichloromethane-ether-hexane to give 3'H-cyclopropa [16α,17α]androstan-17β-ol-3-one acetate 3,3-cyclic ethylene ketal, 2.94 g., M.P. 158.5–160.5° and 0.29 g. M.P. 155.5–158.5° (95%). Further recrystallization from ether-hexane gave the analytical sample; M.P. 159.5–160.5°;

$\lambda_{max.}^{CHCl_3}$ 5.83μ

NMR in CDCl$_3$, δ 3.93 (ketal, 4 H singlet), 2.00 (acetate, 3 H singlet), 0.92 and 0.82 (C–19 and C–19, two 3 H singlets); [α]$_D^{25}$ +16.82° (CHCl$_3$, c.=0.9869).

Analysis.—Calcd. for C$_{24}$H$_{36}$O$_4$ (percent): C, 74.19; H, 9.34. Found (percent): C, 73.94; H, 9.23.

EXAMPLE 17

To a mixture of 0.50 g. of lithium aluminum hydride and 25 ml. of ether was added a solution of 1.00 g. (2.58 moles) of ethylene ketal prepared as in Example 16 in 10 ml. of tetrahydrofuran. The solution was stirred and heated under reflux for one hour, cooled, diluted with dichloromethane and treated with excess saturated sodium sulfate solution. The organic layer was washed repeatedly with water, dried and concentrated to give 830 mg. of a colorless crystalline residue of crude 3'H-cyclopropa [16α,17α]5α-androstan-17β-ol-3-one 3,3 - cyclic ethylene ketal. This was dissolved in 8 ml. of pyridine and treated with 8 ml. of propionic anhydride. The solution was allowed to stand at room temperature for 4 days and then poured into 200 ml. of ice and water. The resulting precipitate was collected by filtration and dissolved in dichloromethane. The solution was dried and concentrated to give 1.11 g. of a tan crystalline residue of crude 3'H- cyclopropa [16α,17α]5α-androstan-17β - ol - 3 - one propionate 3,3-cyclic ethyleneketal. This was dissolved in 20 ml. of tetrahydrofuran and treated with 15 ml. of 3 N perchloric acid. The solution was stirred at room temperature for 2.25 hours and poured into 200 ml. of water containing 3.8 g. of sodium bicarbonate. The resulting precipitate was collected by filtration and dissolved in dichloromethane. The solution was dried and concentrated to give 786 mg. of crude 3'H-cyclopropa [16α,17α] 5α-androstan-17β-ol-3-one propionate as oily yellow crystals. Purification of this material afforded a sample of M.P. 129.5–132.5° identical with the material prepared in Example 14.

EXAMPLE 18

A solution of 20.0 g. (0.053 mole) of 5α-androst-16-en-3β,17β-diol diacetate in 340 ml. of diglyme (dried over Type 4A molecular sieves) in a 2 l. round bottom flask was heated under reflux with vigorous stirring while a solution of 65 g. (0.423 mole) of sodium chlorodifluoroacetate in 320 ml. of diglyme was added over 30 minutes. The solution was heated under reflux for an additional 5 minutes and then 200 ml. of solvent was distilled out under vacuum over 15 minutes. The reaction was cooled with an ice bath and poured into 3 l. of ice water. The resulting precipitate was collected by filtration and dissolved in dichloromethane. The solution was dried, filtered through a short column of silica gel and concentrated to an oil which spontaneously crystallized. Recrystallization from dichloromethane-ether-hexane gave 18.8 g. (83%) of 3',3'-difluoro - 3'H - cyclopropa ['16α,'17α] 5α-androstane-3β,17β-diol diacetate as colorless crystals (17.1 g., M.P. 155.5–158.5° and 1.7 g., M.P. 151.5–157.5°). Further recrystallization from ether-hexane gave the analytical sample; M.P. 157.5°–159°;

$$\lambda_{max.}^{CHCl_3} \text{ 5.68 and 5.80}\mu$$

NMR in CDCl$_3$, δ 4.7 (C–3, 1 H br multiplet), 2.10 and 2.04 (3 and 17 acetates, two 3 H singlets), 0.95 and 0.85 (C–19 and C–18, two 3 H singlets); $[α]_D^{25}$ −10.37° (CHCl$_3$, c.=1.273).

Analysis.—Calcd. for C$_{24}$H$_{34}$F$_2$O$_4$ (percent): C, 67.90; H, 8.07; F, 8.95. Found (percent): C, 68.13; H, 8.08; F, 9.08.

EXAMPLE 19

To a solution of 15.6 g. (0.0037 mole) of difluoro cyclopropyl steroid prepared as in Example 18 in 75 ml. of methanol and 10 ml. of tetrahydrofuran was added 1.5 ml. of concentrated hydrochloric acid. The reaction was stirred at room temperature and after 3.3 hours it was poured into 1 l. of ice and water. The resulting precipitate was collected by filtration and dissolved in dichloromethane. The solution was dried and evaporated to give crude 3',3' - difluoro-3'H-cyclopropa [16α,17a]5α-androstan-3β,17β-diol 17-acetate which could be recrystallized from ether to give a purer sample [M.P. 146–152°; NMR in CDCl$_3$; δ 3.55 (C–3, 1 H br multiplet), 2.09 (acetate, 3 H singlet), 0.94 and 0.82 (C–19 and C–18, two 3 H singlets); found, percent: C, 69.70, 69.46; H, 8.40, 8.39; F, 10.03; C$_{22}$H$_{32}$F$_2$O$_3$ requires, percent: C, 69.09; H, 8.43; F, 9.93] but which in this example was directly oxidized with 1.7 ml. of Jones' reagent in 75 ml. of acetone. After addition of some isopropanol the reaction mixture was filtered through filter-aid and diluted with water. The organic solvents were removed under vacuum and the aqueous suspension was filtered. The solid was dissolved in dichloromethane and the solution was dried and evaporated. The resulting solid was recrystallized from dichloromethane-ether to give 0.60 g. (43%) of 3,3'-difluoro-3'H-cyclopropa [16α,17α]5α - androstan-17β-ol-3-one acetate as colorless crystals, M.P. 196–198°. Further recrystallization gave the analytical sample; M.P. 197–199°;

$$\lambda_{max.}^{CHCl_3} \text{ 5.62 and 5.75}\mu$$

NMR in CDCl$_3$, δ 2.09 (acetate, 3 H singlet), 1.02 and 0.98 (C–19 and C–18, two 3 H singlets); $[α]_D^{25}$ +15.05° (CHCl$_3$, c.=1.083).

Analysis.—Calcd. for C$_{22}$H$_{30}$F$_2$O$_3$ (percent): C, 69.45; H, 7.95; F, 9.99. Found (percent): C, 69.71; H, 7.97; F, 9.87.

EXAMPLE 20

To a slurry of 2.00 g. (0.0058 mole) of cyclopropyl steroid prepared as in Example 10 in 80 ml. of ethanol was added 0.4 ml. (0.0068 mole) of 85% hydrazine hydrate. The reaction was stirred at room temperature and soon became homogeneous and then became heterogeneous. After 35 minutes the solvent was removed under vacuum and the 3-hydrazone formed was dissolved in a minimum amount of chloroform at room temperature. After 5 days, when TLC in 5% methanol in chloroform indicated that most of the intermediate hydrazone was gone, the solution was concentrated with the addition of methanol to give 1.44 g. (72%) of 3'H-cyclopropa[16α, 17α]androstan - 17β - ol-3-azine diacetate as pale yellow crystals; M.P. >320° and homogeneous by TLC in 5% methanol in chloroform. Further recrystallization from chloroform-methanol gave the analytical sample;

$$\lambda_{max.}^{CHCl_3} \text{ 5.75 and 6.13}\mu; \lambda_{max.}^{C_2H_5OH} \text{ 232 m}\mu \text{ (} \epsilon \text{ 6480)}$$

NMR in CDCl$_3$, δ 1.97 (OAc, 6H singlet), 0.90 (C–18 and C–19, 12 H singlet); $[α]_D^{25}$ +67.43° (CHCl$_3$, c.=1.008).

Analysis.—Calcd. for C$_{44}$H$_{64}$N$_2$O$_4$ (percent): C, 77.14; H, 9.42; N, 4.09. Found (percent): C, 77.19; H, 9.47; N, 4.19.

EXAMPLE 21

A mixture of 3.00 g. (0.0087 mole) of cyclopropyl steroid prepared as in Example 10 and 4.08 g. (0.018 mole) of DDQ in 90 ml. of dioxane was heated under reflux for 2.75 hours. The cooled mixture was filtered, the solid (2,3 - dichloro - 5,6 - dicyanohydroquinone) was washed with dioxane and the combined filtrates were concentrated under vacuum to give a gummy residue. This was dissolved in dichloromethane and adsorbed onto 200 g. of silica gel. Elution with ether and 20% ethyl acetate in ether removed all the steroidal materials and little if any DDQ or hydroquinone. The steroidal material was again adsorbed onto 100 g. of silica gel from dichloromethane solution. Elution with 5% ether in dichloromethane or less polar solvents removed practically nothing. Elution with 250 ml. of 7% ether in dichloromethane gave a fraction rich in 17β-hydroxy-3'H-cyclopropa[16α,17α]5α-androst-1-en-3-one acetate which crystallized upon evaporation. Recrystallization first from dichloromethane-ether-hexane and then from ether gave 0.702 g. as colorless crystals, M.P. 187–188°. The analytical sample had M.P. 187–188.5°;

$$\lambda_{max.}^{CHCl_3} \text{ 5.75 and 6.00}\mu; \lambda_{max.}^{C_2H_5OH} \text{ 231 m}\mu \text{ (} \epsilon \text{ 10,800)}$$

NMR in CDCl$_3$ δ 7.13 (C–1, 1 H doublet, J.=10 Hz.), 5.82 (C–2, 1 H doublet, J.=10 Hz.), 2.03 (OAc, 3 H singlet) 1.03 and 0.98 (C–19 and C–18, two 3 H singlets); $[α]_D^{25}$ +57.06° (CHCl$_3$, c.=1.076).

Analysis.—Calcd. for C$_{22}$H$_{30}$O$_3$ (percent): C, 77.16; H, 8.83. Found (percent): C, 77.49; H, 9.06.

Further elution of the column with 10, 12, 15 and 17% ether in dichloromethane gave fractions rich in 17β-hydroxy - 3'H - cyclopropa[16α,17α]androsta-1,4-dien-3-one acetate, which crystallized upon evaporation. Recrystallization from dichloromethane-ether gave 0.867 g. as colorless crystals, M.P. 218.5–220.5°. Further recrystallization gave the analytical sample; M.P. 219–220.5°;

$$\lambda_{max.}^{CHCl_3} \text{ 5.75 and 6.02}\mu; \lambda_{max.}^{C_2H_5OH} \text{ 242 m}\mu \text{ (} \epsilon \text{ 15,600) and 300 (infl.) (3300)}$$

NMR in CDCl$_3$, δ 7.05 (C–1, 1 H doublet, J.=10 Hz.), 6.23 (C–2, 1 H quartet, J.=10 and 2 Hz.), 6.07 (C–4, 1 H sharp multiplet), 2.04 (OAc, 3 H singlet), 1.25 (C–19, 3 H singlet) and 1.03 (C–18, 3 H singlet); $[\alpha]_D^{25}$ +54.78° (CHCl$_3$, c.=0.9766).

*Analysis.*—Calcd. for C$_{22}$H$_{28}$O$_2$ (percent): C, 77.61; H, 8.29. Found (percent): C, 77.78; H, 8.25.

EXAMPLE 22

A mixture of 3.43 g. (0.0101 mole) of 17β-hydroxy-3'H-cyclopropa[16α,17α]androsta-1,4-dien-3-one acetate, 3.43 g. of tris-(triphenylphosphine)rhodium chloride, 540 ml. of benzene and 60 ml. of ethanol was shaken under a hydrogen atmosphere at room temperature and pressure. After 3.75 hours the rate of uptake had slowed considerably and the shaking was stopped. The total uptake was 225 ml. (theoretical uptake was 243 ml.). The solution was concentrated under vacuum and the residue was dissolved in dichloromethane and passed over a column of alumina. The dichloromethane was evaporated to give a residue of red crystals. This was recrystallized from dichloromethane-ether to give a mixture of pale yellow crystals and red solid. Trituration with dichloromethane dissolved the yellow crystals and the red solid was discarded. The dichloromethane was evaporated and the residue was recrystallized from dichloromethane-ether to give 2.89 g. of 17β - hydroxy-3'H-cyclopropa[16α,17α]androst-4-en-3-one acetate as colorless crystals, M.P. 207–210°. Further recrystallization gave the analytical sample; M.P. 211–214°;

$\lambda_{max.}^{CHCl_3}$ 5.68, 6.05 and 6.23μ; $\lambda_{max.}^{C_2H_5OH}$ 241 mμ (ε 16,900)

NMR in CDCl$_3$, δ 5.75 (4–H, 1 H singlet), 2.02 (acetate, 3 H singlet), 1.21 (C–19, 3 H singlet), 0.98 (C–18, 3 H singlet); $[\alpha]_D^{25}$ +112.79° (CHCl$_3$, c.=1.032).

*Analysis.*—Calcd. for C$_{22}$H$_{30}$O$_3$ (percent): C, 77.16; H, 8.83. Found (percent): C, 77.20; H, 8.62.

EXAMPLE 23

Hydrogen chloride was passed over the surface of a solution of 1.470 g. (0.0043 mole) of conjugated ketone prepared as in Example 22 in 60 ml. of dioxane and over a solution of 0.976 g. (0.0043 mole) of DDQ in 60 ml. of dioxane for a few seconds. The two solutions were mixed and stirred while hydrogen chloride was passed over the surface for 2 minutes. A precipitate formed, the hydrogen chloride was turned off and the mixture was stirred for an additional 5 minutes. The precipitate (2,3-dicyano-5,6-dichlorohydroquinone) was removed by filtration and the filtrate was poured into 1 l. of water. The resulting precipitate was collected by filtration and dissolved in dichloromethane. The solution was passed over a short column of alumina and concentrated. The resulting oil was crystallized from ether-hexane and recrystallized from dichloromethane-ether-hexane. A total of 0.818 g. (56%) of pure 17β - hydroxy-3'H-cyclopropa[16α,17α]androsta-4,6-dien-3-one acetate was obtained and the analytical sample was obtained from dichloromethane-hexane; M.P. 149–152° after a change at ~142°;

$\lambda_{max.}^{CHCl_3}$ 5.74, 6.03 and 6.20μ; $\lambda_{max.}^{C_2H_5OH}$ 284 mμ (ε 24,500)

NMR in CDCl$_3$, 6.07 (C–6 and C–7, 2 H singlet), 5.67 (C–4, 1 H singlet), 2.01 (OAc, 3 H singlet), 1.12 (C–19, 3 H singlet) and 1.01 (C–18, 3 H singlet); $[\alpha]_D^{25}$ +56.9° (CHCl$_3$, c.=1.07).

*Analysis.*—Calcd. for C$_{22}$H$_{28}$O$_3$ (percent): C, 77.61; H, 8.29. Found (percent): C, 77.48; H, 8.43.

EXAMPLE 24

To a solution of 594 mg. (1.74 mmoles) of dienone prepared as in Example 23 in 6 ml. of dioxane was added 1.5 ml. of ethyl mercaptan and 180 mg. of sodium methoxide. The heterogeneous reaction was stirred at room temperature for 7 days and then filtered. The filtrate was concentrated under a stream of air and the resulting oil was dissolved in dichloromethane. The solution was filtered through filter-aid and concentrated. The residue was crystallized from ether and recrystallized from dichloromethane-ether to give 304 mg. (43%) of 7α-ethylthio - 17β - hydroxy - 3'H-cyclopropa[16α,17α]androst-4-en-3-one acetate as colorless crystals, M.P. 199–202.5°. Further recrystallization gave the analytical sample; M.P. 200–208°;

$\lambda_{max.}^{CHCl_3}$ 5.73 and 6.01μ; $\lambda_{max.}^{C_2H_5OH}$ 241 mμ (ε 17,800)

NMR in CDCl$_3$, δ 5.78 (C–4, 1 H singlet), 2.96 (C–7, 1 H multiplet) 2.02 (OAc, 3 H singlet), 1.22 (C–19, 3 H singlet) and 0.97 (C–18, singlet); $[\alpha]_D^{25}$ −3.2° (CHCl$_3$, c.=0.69).

*Analysis.*—Calcd. for C$_{24}$H$_{34}$O$_3$S (percent): C, 71.60; H, 8.51; S, 7.96. Found (percent): C, 71.51; H, 8.37; S, 7.72.

EXAMPLE 25

To a warm solution of 100.0 g. (0.30 mole) of 5α-androstan-3β-ol-17-one acetate in 500 ml. of methanol and 100 ml. of trimethyl orthoformate was added 1.0 ml. of concentrated sulfuric acid. The solution was swirled for a few minutes until complete solidification took place and then allowed to stand for the remainder of 10 minutes. Ten milliliters of pyridine was added, the reaction was stirred and cooled and then filtered. The colorless solid was washed with methanol containing a little pyridine to give crude 17,17-dimethoxy-5α-androstan-3β-ol acetate, M.P. 115–125°. One recrystallization from dichloromethane and methanol containing a little pyridine gave 89.6 g., M.P. 144–149°. Further recrystallization gave the analytical sample; M.P. 148–151°;

$\lambda_{max.}^{CHCl_3}$ 5.81μ

NMR in CDCl$_3$, δ 4.7 (3–H, 1 H broad), 3.20 (O—CH$_3$, 6 H singlet), 2.00 (O—Ac, 3 H singlet), 0.86 and 0.83 (C–19 and C–18, two 3 H singlets); $[\alpha]_D^{25}$ +1.03° (CHCl$_3$, c.=0.970).

*Analysis.*—Calcd. for C$_{23}$H$_{38}$O$_4$ (percent): C, 72.98; H, 10.12. Found (percent): C, 72.91; H, 9.83.

EXAMPLE 26

A mixture of 3 l. of toluene, 1.000 g. (0.00526 mole) of p-toluenesulfonic acid monohydrate and 0.426 ml. (0.417 g., 0.00526 mole) of pyridine was heated and 200 ml. of solvent was distilled. The solution was cooled slightly and 89.6 g. (0.236 mole) of dimethyl ketal prepared as in Example 25 was added. Heating was resumed and over 1.5 hour 400 ml. of solvent was distilled. After 1 hour the reaction was cooled somewhat and concentrated under vacuum to leave a light yellow solid of crude 17-methoxy-5α-androst-16-en-3β-ol acetate.

A solution of 2.40 g. of cupric acetate monohydrate in 400 ml. of acetic acid was heated on the steam bath and 160 g. of 20 mesh granular zinc was added. The mixture was stirred for 3 minutes and the solvent was removed. The residue was washed once with 400 ml. of hot acetic acid and then 3 times with 400 ml. of ether at room temperature. To the resulting zinc-copper couple was added 100 ml. of ether and then a solution of the crude enol ether prepared above in 150 ml. of diiodomethane and 250 ml. of dichloromethane. The reaction was stirred and heated under reflux overnight. The cooled reaction was poured into a separatory funnel containing some ice. The aqueous (bottom) layer was separated and the organic layer was washed twice with water, dried and evaporated. The residue was crystallized from methanol and recrystallized first from dichloromethane-methanol and then from ether-hexane to give 10.4 g. of 17β-methoxy-3'H-cyclopropa [16α,17α]5α-androstan-3β-ol acetate as colorless crystals, M.P. 127–130°. The combined mother liquors were chromatographed over a column of silica gel. Hexane and 20% and 50% benzene in hexane eluted material rich in product. Recrystallization gave another 27.1 g. M.P. 124–129.5°. Further recrystallization from hexane gave the analytical sample; M.P. 127–130°;

$\lambda_{max.}^{CHCl_3}$ 5.88μ

NMR in CDCl$_3$; δ 4.66 (3–H, 1 H broad), 3.30 (O—CH$_3$, 3 H singlet), 1.99 (OAc, 3 H singlet), 0.98 (C–19, 3 H, singlet), 0.82 (C–18, 3 H singlet); [α]$_D^{25}$ +19.44° (CHCl$_3$, c.=0.9004).

*Analysis.*—Calcd. for C$_{23}$H$_{36}$O$_3$ (percent): C, 76.62; H, 10.06. Found (percent): C, 76.46; H, 10.03.

EXAMPLE 27

A mixture of 29.1 g. (0.81 mole) of cyclopropyl steroid prepared as in Example 26, 29.1 g. of potassium bicarbonate, 1200 ml. of methanol and 300 ml. of water was heated under reflux for 1.5 hour. The methanol was evaporated under vacuum and the residue was diluted with water and filtered. The solid was dissolved in dichloromethane, dried and evaporated. The crystalline residue was recrystallized from dichloromethane-hexane to give 21.25 g. (83%) of 17β - methoxy - 3'H-cyclopropa [16α,17α]5α-androstan-3β-ol as colorless crystals, M.P. 190–194°. Further recrystallization from ether-hexane gave the analytical sample; M.P. 194.5–196.5°; NMR in CDCl$_3$, δ 3.55 (3–H, 1 H broad multiplet), 3.30 (OCH$_3$, 3 H singlet), 1.00 and 0.82 (C–18 and C–19, two 3 H singlets); [α]$_D^{25}$ +30.32° (CHCl$_3$, c.=1.151).

*Analysis.*—Calcd. for C$_{21}$H$_{34}$O$_2$ (percent): C, 79.19; H, 10.76. Found (percent): C, 79.45; H, 10.56.

EXAMPLE 28

To a solution of 92.5 ml. of pyridine in 2.75 l. of dichloromethane was added gradually 40.4 g. of chromium trioxide followed by a solution of 23.1 g. (0.0725 mole) of 3-ol prepared as in Example 27 in 900 ml. of dichloromethane. The mixture was stirred for 20 minutes, washed with water, dried, passed over a short column of Florisil and concentrated to give a colorless crystalline residue. Recrystallization from dichloromethane-ether-hexane gave 20.57 g. (90%) of 17β-methoxy-3'H-cyclopropa [16α,17α]5α-androstan-3-one, M.P. 150–153°. Further recrystallization from ether-hexane gave the analytical sample; M.P. 149.5–151°;

$\lambda_{max.}^{CHCl_3}$ 5.92μ

NMR in CDCL$_3$ δ 3.33 (O—CH$_3$, 3 H singlet), 1.04 (C–18 and C–19, 6 H singlet); [α]$_D^{25}$ +55.44° (CHCl$_3$, c.=1.048).

*Analysis.*—Calcd. for C$_{21}$H$_{32}$O$_2$ (percent): C, 79.70; H, 10.19. Found (percent): C, 79.67; H, 10.04.

EXAMPLE 29

To a rapidly stirred solution of 3.00 g. (0.0095 mole) of 3-ketone prepared as in Example 28 in 60 ml. of pyridine and 10 ml. of ethyl formate was added a solution of sodium methoxide prepared from 0.84 g. (0.04 g.-atom) of sodium and 7.8 ml. of methanol. Within one minute the reaction mixture set solid and was allowed to stand for 45 minutes. It was then diluted with water, made no longer basic with acetic acid and extracted with dichloromethane. The dichloromethane extract was dried, passed over a little silica gel and concentrated to an almost colorless oil. Crystallization and recrystallization from dichloromethane-ether gave 2.83 g. (87%) of 2-hydroxymethylene-17β-methoxy - 3'H - cyclopropa [16α, 17α]5α-androstan-3-one as colorless crystals, M.P. 174–176°. Further recrystallization gave the analytical sample; M.P. 175–176°;

$\lambda_{max.}^{CHCl_3}$ 6.16 and 6.37μ; $\lambda_{max.}^{C_2H_5OH}$ 283 mμ (ϵ 9400)

NMR in CDCl$_3$, δ 8.77 (2 CHOH or 2 CHO, 1 H doublet), 3.35 (OCH$_3$, 3 H singlet) 1.04 (C–19, 1 H singlet), 0.81 (C–18, 1 H singlet); [α]$_D^{25}$ +75.39° (CHCl$_3$, c.=0.4709).

*Analysis.*—Calcd. for C$_{22}$H$_{32}$O$_3$ (percent): C, 76.70; H, 9.36. Found (percent): C, 76.49; H, 9.10.

EXAMPLE 30

A mixture of 1.065 g. (0.0031 mole) of hydroxymethylene steroid prepared as in Example 29, 25 ml. of ethanol and 0.4 ml. of 85% hydrazine hydrate was heated under reflux for 30 minutes and the solvent was removed under vacuum to leave a colorless crystalline residue. Recrystallization from dichloromethane-ether gave 917 mg. (87%) of 17β-methoxy-3'H-cyclopropa [16α,17α] 5α-androstano[3,2-c]-pyrazole as colorless crystals, M.P. 243–245°. Further recrystallization gave the analytical sample; M.P. 244–246°;

$\lambda_{max.}^{CHCl_3}$ 2.88μ; $\lambda_{max.}^{C_2H_5OH}$ 224 mμ (ϵ 4750)

NMR in CDCl$_3$, δ 10.69 (NH, 1 H broad) 7.25 (pyrazole C—H, occurs with CHCl$_3$), 3.33 (OCH$_3$, 3 H singlet), 1.02 (C–19, 3 H singlet), 0.74 (3 H singlet); [α]$_D^{25}$ +78.02° (CHCl$_3$, c.=1.084).

*Analysis.*—Calcd. for C$_{22}$H$_{32}$N$_2$O (percent): C, 77.60; H, 9.47; N, 8.23. Found (percent): C, 77.22; H, 9.48; N, 8.19.

EXAMPLE 31

To a flask containing 8.27 g. (0.024 mole) of hydroxymethylene steroid prepared as in Example 29 was added 250 ml. of hot acetic acid and the flask was immediately placed in an oil bath preheated to 170°. Four minutes later a solution of 3.68 g. (0.053 mole) of hydroxylamine hydrochloride and 4.14 g. (0.0505 mole) of sodium acetate in 47 ml. of water was added. The solution began to boil 4 minutes later and was allowed to boil under reflux for 5 minutes. It was then immediately removed from the oil bath, cooled in an ice bath and poured into 3.5 l. of water. The resulting precipitate was collected by filtration and dissolved in dichloromethane. The solution was dried and concentrated under vacuum. The residue was dissolved in benzene and adsorbed on a silica gel column. Elution with solvents from benzene through 5% ether in dichloromethane gave crystalline fractions which were combined and recrystallized from dichloromethane-ether to give 4.792 g. (58%) of 17β-methoxy-3'H-cyclopropa [16α,17α]5α-androstano[2,3-d]isoxazole as colorless crystals M.P. 144–145.5° Further recrystallization gave the analytical sample; M.P. 142.5–143.5°;

$\lambda_{max.}^{C_2H_5OH}$ 224 mμ (ϵ 5200)

NMR in CDCl$_3$, δ 8.03 (isoxazole C—H, 1 H singlet), 3.30 (OCH$_3$, 3 H singlet), 0.99 (C–19, 3 H singlet) and 0.72 (C–18, 3 H singlet); [α]$_D^{25}$ +76.2° (CHCl$_3$, c.=1.02).

*Analysis.*—Calcd. for C$_{22}$H$_{31}$NO$_2$ (percent): C, 77.38; H, 9.15; N, 4.10. Found (percent): C, 77.53; H, 9.26; N, 3.94.

EXAMPLE 32

A hot solution of 1.00 g. of hydroxylamine hydrochloride in 6 ml. of water was added to a hot solution of 2.00 g. (0.058 mole) of hydroxymethylene steroid prepared as in Example 29 in 30 ml. of pyridine. The solution was heated under reflux for 3 hours and allowed to cool to room temperature overnight. The solvents were removed under vacuum and the residue was diluted with dichloromethane and washed twice with water. The solution was dried and concentrated and the residue was stirred at room temperature for 30 minutes with 30 ml. of tetrahydrofuran and 0.76 g. of sodium methoxide. The solvent was evaporated, the residue was mixed with water and extracted with dichloromethane. The extracts were dried and concentrated. The residue was dissolved in benzene and adsorbed onto a column of silica gel. Elution with solvents from 5% dichloromethane in benzene through 10% ether in dichloromethane gave crystalline fractions which were combined and recrystallized from dichloromethane-ether to give 1.55 g. (78%) of 17β-methoxy-3'H-cyclopropa [16α,17α]5α - androstano [3,2-c]isoxazole as colorless crystals, M.P. 166.5–168°.

Further recrystallization gave the analytical sample; M.P. 167.5–168.5°;

$\lambda_{max.}^{C_2H_5OH}$ 223 mμ (ε 4470)

NMR in CDCl$_3$, δ 8.12 (isoxazole C—H, 1 H singlet), 3.34 (OCH$_3$, 3 H singlet), 1.03 (C–19, 3 H singlet), 0.76 (C–18, 3 H singlet); [α]$_D^{25}$ +71.4° (CHCl$_3$, c.=1.08.

*Analysis.*—Calcd. for C$_{22}$H$_{31}$NO$_2$ (percent): C, 77.38; H, 9.15; N, 4.10. Found (percent): C, 77.50; H, 8.87; N, 4.02.

EXAMPLE 33

A mixture of 100 g. (0.30 mole) of isoandrosterone acetate, 500 ml. of absolute ethanol and 100 ml. of triethyl orthoformate was heated on the steam bath until solution took place and then 2.5 ml. of concentrated sulfuric acid was added. Heating was continued for 3 minutes, the reaction was cooled to room temperature and 15 ml. of pyridine was added. The mixture was cooled in an ice bath and the 17-diethyl ketal was isolated by filtration and dried partially in the vacuum oven. The M.P. of the solid obtained was about 90°. A mixture of 3 l. of toluene and 2.5 ml. of a 2.0 M aqueous solution of pyridinium tosylate was heated and 250 ml. of liquid was distilled out. The toluene was allowed to cool slightly and the total crude solid of the above 17-diethyl ketal was added. Heating was resumed and 320 ml. of solvent was distilled out over 50 minutes. The remaining solvent was then removed under vacuum to give a yellow oil of crude 17-ethoxy-androst-16-en-3β-ol acetate. This was mixed with 250 ml. of dichloromethane and 150 ml. of diiodomethane and added to the zinc-copper couple [prepared from 160 g. of granular (20 mesh zinc)] and 100 ml. of ether. The mixture was stirred and heated under reflux overnight. The cooled solution was poured into a separatory funnel containing some ice and shaken. The aqueous (bottom) layer was discarded and the organic layer was washed with water, dried and evaporated to give a yellow oil. Approximately one-third of this oil was dissolved in hexane and adsorbed onto 200 g. of silica gel. Elution with less polar solvents removed a number of other materials and then elution with ether gave crude crystalline product. Recrystallization from dichloromethane-ether gave 8.72 g. (~25%) of 17β-ethoxy-3'H-cyclopropa [16α,17α]5α-androstan-3β-ol acetate as colorless crystals, M.P. 150.5–152°. Further recrystallization gave the analytical sample; M.P. 151–152°;

$\lambda_{max.}^{CHCl_3}$ 5.79μ

NMR in CDCl$_3$ δ ~4.65 (C–3, 1 H multiplet), ~3.50 (CH$_3$CH$_2$O, 2 H AB of quartets, J.=9 Hz.), 1.98 (OAc, 3 H singlet), 1.11 (CH$_3$CH$_2$O, triplet), 0.98 (C–19, 3 H singlet), 0.82 (C–18, 3 H singlet); [α]$_D^{25}$ +15.1° (CHCl$_3$, c.=0.976).

*Analysis.*—Calcd. for C$_{24}$H$_{38}$O$_3$ (percent): C, 76.96; H, 10.23. Found (percent): C, 76.70; H, 10.27.

EXAMPLE 34

A mixture of 8.54 g. (0.0228 mole) of cyclopropyl steroid prepared as in Example 33, 8.54 g. of potassium bicarbonate, 400 ml. of methanol, and 100 ml. of water was heated under reflux for 1.5 hour. Some hot water was added, most of the methanol was evaporated under vacuum, the residue was diluted with water and, after cooling, the resulting precipitate was collected by filtration and dissolved in dichloromethane. The solution was dried and evaporated to give a colorless crystalline residue of 17β-ethoxy-3'H-cyclopropa [16α,17α]5α-androstan-3β-ol. The crude solid was dissolved in 330 ml. of dichloromethane and added over 5 minutes to a solution prepared by adding in small portions 14.7 g. of chromium trioxide to 1 l. of dichloromethane and 35.4 ml. of pyridine. After stirring for 20 minutes, the dichloromethane was decanted from the inorganic solid, washed with water, dried, passed over a little Florisil, and concentrated to give a crystalline residue. Recrystallization from dichloromethaneether-hexane gave 6.245 g. (77%) of 17β-ethoxy-3'H-cyclopropa [16α,17α]5α-androstan-3-one as colorless crystals, M.P. 146.5–158°. Further recrytallization gave the analytical sample: M.P. 147–154.5°;

$\lambda_{max.}^{CHCl_3}$ 5.86μ

NMR in CDCl$_3$ δ 3.57 (CH$_3$CH$_2$O, 2 H multiplet), 1.13; (CH$_3$CH$_2$O, triplet), and 1.03 (C–18 and C–19, 6 H singlet), [α]$_D^{25}$ +50.2° (CHCl$_3$, c.=0.973).

*Analysis.*—Calcd. for C$_{22}$H$_{34}$O$_2$ (percent): C, 79.95; H, 10.37. Found (percent): C, 79.95; H, 10.51.

EXAMPLE 35

A solution of sodium methoxide prepared from 1.56 g. (0.068 g-atom) of sodium and 14.5 ml. of methanol was added all at once to a stirred solution of 5.573 g. (0.0169 mole) of 3-ketone prepared as in Example 34 in 110 ml. of pyridine and 18.5 ml. of ethyl formate. The reaction set solid almost immediately and was allowed to stand for 45 minutes. It was then diluted with water, made no longer basic with acetic acid, and extracted with dichloromethane. The extract was dried and concentrated to give a pale yellow solid. This was dissolved in benzene and passed over a column of silica gel. The first benzene fraction contained 3.75 g. of a white solid of 2-hydroxymethylene-17β-ethoxy-3'H-cyclopropa [16α,17α]5α-androstan-3-one. To a flask containing the 3.75 g. of this material was added 115 ml. of hot acetic acid and it was immediately immersed in an oil bath heated to 160°. Three minutes later a solution of 1.67 g. of hydroxylamine hydrochloride and 1.88 g. of sodium acetate in 21 ml. of water was added. In 2 minutes the reaction began to boil and heating was continued under reflux for an additional 5 minutes. The solution was immediately cooled in an ice bath and then poured into 2 l. of ice and water. The resulting precipitate was collected by filtration and dissolved in dichloromethane. The solution was dried and concentrated and the residue was dissolved in benzene and absorbed onto a column of 38 g. of silica gel. Elution with benzene, mixtures of dichloromethane and benzene, and with dichloromethane gave colorless crystalline fractions which were recrystallized from dichloromethane-ether to give 789 mg. (13% overall) of 17β-ethoxy-3'-H-cyclopropa [16α,17α]5α-androstano[2,3-d]-isoxazole, M.P. 160.5–162°. Further recrystallization gave the analytical sample: M.P. 160.5–162.5°;

$\lambda_{max.}^{C_2H_5OH}$ 228 mμ (ε 5260)

NMR in CRCl$_3$ δ 8.06 (isoxazole C—H, 1 H singlet), 3.65 (CH$_3$CH$_2$O, 2 H multiple), 1.21 CH$_3$CH$_2$O, triplet), 1.07 (C–19, 3 H singlet), and 0.79 (C–18 3 H singlet); [α]$_D^{25}$ +68.3° (CHCl$_3$, c.=0.956).

*Analysis.*—Calcd. for C$_{23}$H$_{33}$NO$_2$ (percent): C, 77.70; H, 9.26; N, 3.94. Found (percent): C, 77.69; H, 9.26; N, 3.63.

EXAMPLE 36

17β - ethoxy - 3'H - cyclopropa[16α,17α]5α - androstano[3,2-c]pyrazole was prepared starting with the product of Example 34 by proceeding in a similar manner as that described in Example 30.

EXAMPLE 37

17β - ethoxy - 3'H - cyclopropa[16α,17α]5α - androstan[3,2-c]isoxazole was prepared starting with the product of Example 34 by proceeding in a similar manner as that described in Example 32.

EXAMPLE 38

A solution of 40 mg. of cyclopropyl diacetate prepared as in Example 1 in 0.5 ml. of dichloromethane and 0.5 ml. of ether was mixed with 0.87 ml. of a 2.3 M solution of tert.-butylmagnesium chloride in ether. The solution was stirred at room temperature overnight and the reaction mixture was worked up by the procedure used in Example 2 to give 3'H-cyclopropa[16α,17α]5α-androstane-3β,17β-diol, identical with that prepared in Example 2.

EXAMPLE 39

A solution of 2.00 g. (6.6 mmole) of diol prepared as in Examples 2 and 38 and 15 mg. of p-toluenesulfonic acid in 50 ml. of propionic acid and 13 ml. of propionic anhydride was allowed to stand at room temperature for 7 days and then poured into a mixture of ice and water. The resulting precipitate was collected by filtration and dissolved in dichloromethane. The solution was washed with water, dried and concentrated. The residue was crystallized from dichloromethane-ether-pentane to give 3'H-cyclopropa[16α,17α]5α - androstane - 3β,17β - diol dipropionate, M.P. 150–155°, identical with that prepared in Example 12.

EXAMPLE 40

To a mixture of 134 g. (0.34 mole) of isoandrosterone benzoate and 600 ml. of isopropenyl acetate was added a solution of 0.6 ml. of concentrated sulfuric acid in 30 ml. of isopropenyl acetate. The reaction was heated and gradually distilled over a period of 21 hours while 1100 ml. of isopropenyl acetate and 2.4 ml. of concentrated sulfuric acid in 120 ml. of isopropenyl acetate were gradually added, a total of 825 ml. of distillate was collected. The solution was allowed to stand at room temperature for 3 days and the resulting precipitate was collected by filtration and washed with hexane to give 117 g. of crude 17β - acetoxy-androst - 16 - en - 3β - ol benzoate. This was dissolved in benzene and absorbed onto a silica gel column. The first benzene fractions eluted 14.1 g. of pure enol acetate.

Granular zinc (10.12 g., 20 mesh) was added to a hot (100°) solution of 0.152 g. of cupric acetate monohydrate in 15 ml. of acetic acid and the slurry was stirred at 100° for 4 minutes. The liquid was removed and the residue was washed once with 15 ml. of acetic acid at 100° and three times with 15 ml. of ether at room temperature. The resulting zinc-copper couple was then covered with 15 ml. of ether, a slurry of the above 14.1 g. of above enol acetate in 30 ml. of dichloromethane and 8.55 ml. of diiodomethane was added. The reaction was heated under reflux overnight, cooled to room temperature and shaken with ice and 1 N hydrochloric acid. The organic layer and two dichloromethane extracts of the aqueous layer were combined, washed with water, dried and concentrated to give a colorless crystalline residue. One recrystallization from dichloromethane-ether gave 6.62 g. of 3'H - cyclopropa[16α,17α]5α - androstane - 3β,17β-diol 17-acetate 3-benzoate, M.P. 211–213°. The analytical sample had an identical M.P.;

$\lambda_{max.}^{CHCl_3}$ 5.75 and 5.85μ; $\lambda_{max.}^{C_2H_5OH}$ 227 mμ (ε 15,220), 266 (infl.) (830), 272 (960), and 279 (770)

NMR in CDCl$_3$ δ~7.5 and 8.0 (aromatics, multiplets 5 H total), 4.90 (C–3, 1 H broad multiplet), 2.00 (OAc, 3 H singlet), 0.92 and 0.88 (C–18 and C–19, two 3 H singlets); $[\alpha]_D^{25}$ +10.0° (CHCl$_3$, c.=0.948).

Analysis.—Calcd. for C$_{29}$H$_{38}$O$_4$ (percent): C, 77.30; H, 8.50. Found (percent): C, 77.10; H, 8.53.

EXAMPLE 41

To a solution of 30 mg. of cupric acetate monohydrate in 3 ml. of acetic acid heated to 100° was added 2.0 g. of granular (20 mesh) zinc. The slurry was stirred at 100° for three minutes, the liquid was removed by decantation and the residue was washed once with 3 ml. of acetic acid at 100° and then three times with 3 ml. of ether at room temperature. The resulting zinc-copper couple was covered with 3 ml. of ether and 2 drops of diiodomethane was added. When a reaction commenced, a solution of 2.500 g. (6.75 mmoles) of androsta - 5,16 - diene - 3β,17 - diol diacetate and 0.86 ml. of diiodomethane in 6 ml. of dichloromethane was added during 10 minutes. The reaction was then stirred and heated under reflux overnight. The organic layer and several dichloromethane washes of the zinc were added to a separatory funnel containing ice and 1 N hydrochloric acid. The organic layer was dried and concentrated to leave 2.8 g. of a colorless oil. This was triturated with hexane and the resulting solid was recrystallized from ether-hexane to give 0.48 g. (18%) of 3'H-cyclopropa-[16α,17α]androst - 5 - ene - 3β,17β - diol diacetate as colorless crystals, M.P. 154–158.5°. Further recrystallization gave the analytical sample: M.P. 159–161°;

$\lambda_{max.}^{CHCl_3}$ 5.81μ

UV in ethanol, only end absorption; NMR in CDCl$_3$, δ 5.35 (C–6, 1 H br doublet), 4.6 (C–3, 1 H br multiplet), 2.04 (diacetate, 6 H singlet), 1.20 (C–19, 3 H singlet), 0.95 (C–18, 3 H singlet), $[\alpha]_D^{25°}$ −64.96° (CHCl$_3$, c.=1.056).

Analysis.—Calcd. for C$_{24}$H$_{34}$O$_4$ (percent): C, 74.58; H, 8.87. Found (percent): C. 74.76; H, 8.84.

EXAMPLE 42

To a solution of 410 mg. of cupric acetate monohydrate in 41 ml. of acetic acid heated to 100° was added 27.2 g. of granular (20 mesh) zinc. The slurry was stirred at 100° for 4 minutes, the liquid was removed and the residue was washed once with 41 ml. of acetic acid at 100° and then three times with 41 ml. of ether at room temperature. The resulting zinc-copper couple was covered with 41 ml. of ether and a solution of 30.75 g. (0.087 mole) of estr-1,3,5(10),16-tetraen-3,17-diol diacetate in 82 ml. of dichloromethane and 23 ml. of diiodomethane was added. The reaction was heated under reflux for 6.5 hours and then stirred at room temperature overnight. The organic layer was then poured into a mixture of ice and water. The organic layer and a dichloromethane extract of the aqueous layer were combined, washed with water, dried, and concentrated to give 37 g. of a fluid oil. This was dissolved in hexane and adsorbed onto a column of silica gel. Mixtures of from 5 to 60% of dichloromethane in benzene eluted fractions rich in product. These were combined and crystallized from ether-pentane to give 2.84 g. (8.9%) of 3'H - cyclopropa[16α,17α] estra - 1,3,5(10) - trien - 3,17β-diol diacetate as colorless crystals, M.P. 125.5–127.5°. Further recrystallization gave the analytical sample; M.P. 126.5–128°;

$\lambda_{max.}^{CHCl_3}$ 5.71μ; $\lambda_{max.}^{C_2H_5OH}$ 222 mμ (infl.) (ε 10,600), 260 (infl.) (850), 268 (1020), and 276 (890)

NMR in CDCl$_3$; δ ~7.0 (aromatics, 3 H total), 2.25 and 2.01 (acetates, two 3 H singlets) and 0.94 (C–18, 3 H singlet); $[\alpha]_D^{25}$ +49.1° (CHCl$_3$, c.=0.978).

Analysis.—Calcd. for C$_{23}$H$_{28}$O$_4$ (percent): C, 74.97; H, 7.66. Found (percent): C, 74.94; H, 7.59.

EXAMPLE 43

To a solution of 9.00 g. (0.0276 mole) of 3-methoxy-estra-1,3,5(10),16-tetraen-17-ol acetate in 90 ml. of diglyme stirred and heated under reflux was added over 17 minutes a solution of 25.0 g. (0.164 mole, 6 equiv.) of sodium chlorodifluoroacetate in 100 ml. of diglyme. The rate of addition and of heating were adjusted to maintain a vigorous reflux and after complete addition heating was continued for 10 minutes under reflux and then for 15 minutes under vacuum while 160 ml. of solvent was distilled out. The residue was cooled and poured into 1.5 l. of ice and water. The resulting solid was collected by filtration and dissolved in dichloromethane. The solution was dried, passed over a short column of silica gel and concentrated to give tan crystals. Recrystallization from dichloromethane-ether gave 6.30 g. (61%) of 3',3'-difluoro - 3 - methoxy - 3'H - cyclopropa[16α,17α]estra- 1,3,5(10) - trien - 17β - ol acetate, M.P. 184–189.5. Further recrystallization from dichloromethane-ether with charcoal gave the analytical sample as colorless crystals; M.P. 187.5–190.5°;

$\lambda_{max.}^{CHCl_3}$ 5.68; $\lambda_{max.}^{C_2H_5OH}$ 220 mμ (ε 8300), 278 (2100) and 287 (1950)

NMR in CDCl$_3$, δ 7.10, 6.76 and 6.59 (aromatics, 3 H total), 3.74 (OCH$_3$, 3 H singlet), 2.09 (OAc, 3 H singlet), 0.97 (C–18, 3 H singlet); [α]$_D^{25°}$ +30.69° (CHCl$_3$, c.=1.101).

*Analysis.*—Calcd. for C$_{22}$H$_{26}$F$_2$O$_3$ (percent): C, 70.19; H, 6.96; F, 10.09. Found (percent): C, 70.46; H, 6.94; F, 9.79.

EXAMPLE 44

A mixture of 150 g. (0.45 mole) of isoandrosterone acetate, 750 ml. of n-propanol and 230 ml. of tripropyl orthoformate was heated on the steam bath until solution took place and then 3.5 ml. of concentrated sulfuric acid was added. Heating was continued for 10 minutes, the reaction was allowed to stand at ambient temperature for 20 minutes, 22.5 ml. of pyridine was added and the volatile materials were removed under vacuum to give a residue of 259 g. of crude 17,17-dipropoxy-5α-androstan-3β-ol acetate.

A mixture of 3.9 l. of toluene and 3.75 ml. of a 2.0 M aqueous solution of pyridinium tosylate was heated and 750 ml. of liquid was distilled out. The toluene was allowed to cool slightly and the 259 g. of crude 17,17-dipropoxy-5α-androstan-3β-ol acetate was added. Heating was resumed and 750 ml. of solvent was distilled out over 55 minutes. The remaining solvent was then removed under vacuum to give an oil of crude 17-propoxy-5α-androst-16-en-3β-ol acetate. This was mixed with 375 ml. of dichloromethane and 225 ml. of diiodomethane and added to the zinc-copper couple [prepared from 240 g. of granular (20 mesh) zinc] and 150 ml. of ether. The mixture was stirred and heated under reflux overnight. The cooled solution was poured into a separatory funnel containing some ice and shaken. The aqueous layer was discarded and the organic layer was washed with water, dried and concentrated to give 213 g. of a yellow oil. This was mixed with hexane and adsorbed onto 500 g. of silica gel. Elution with 10 through 70% benzene in hexane gave 125 g. of crude crystalline product which after recrystallization from dichloromethane-hexane gave 24.7 g. (14% yield) of 17β-propoxy-3'H-cyclopropa[16α,17α] 5α - androstan - 3β - ol acetate as colorless crystals, M.P. 139–144°. Further recrystallization gave the analytical sample: M.P. 144–146°;

$\lambda_{max.}^{CHCl_3}$ 5.79μ

NMR in CDCl$_2$ δ 4.67 C–3, 1 H multiplet), ~3.42 (CH$_3$CH$_2$CH$_2$O, 2 H multiplet), 1.99 (OAc, 3 H singlet), 0.97 (C–19, 3 H singlet), 0.87 (CH$_3$CH$_2$CH$_2$O, triplet), and 0.82 (C–18, 3 H singlet); [α]$_D^{25}$ +18.1° CHCl$_3$, c.=0.980).

*Analysis.*—Calcd. for C$_{25}$H$_{40}$O$_3$ (percent): C, 77.27; H, 10.38. Found (percent): C, 77.57; H, 10.61.

EXAMPLE 45

A mixture of 17.8 g. (0.046 mole) of cyclopropyl steroid prepared as in Example 44, 17.8 g. of sodium bicarbonate, 1 l. of methanol and 250 ml. of water was heated under reflux for 1.5 hour. The methanol was evaporated under vacuum and the residue, was diluted with water and filtered. The solid was dissolved in dichloromethane and the solution was dried and concentrated to a small volume. The resulting crystals were filtered and washed with ether to give (in two crops) 11.48 g. (72%) of 17β - propoxy - 3'H - cyclopropa[16α,17α]5α-androstan -3β-ol as colorless crystals, M.P. 198–199.5°. Further recrystallization gave the analytical sample; M.P. 199.5–200.5°; NMR in CDCl$_3$, δ ~3.4 (C–3 and CH$_3$CH$_2$CH$_2$O, 3 H multiplet), 1.00 (C–19, 3 H singlet), 0.88 (CH$_3$CH$_2$CH$_2$O, triplet), and 0.82 (C–18, 3 H singlet); [α]$_D^{25}$ +28.5° (CHCl$_3$, c.=1.08).

*Analysis.*—Calcd. for C$_{23}$H$_{38}$O$_2$ (percent): C, 79.71; H, 11.05. Found (percent): C, 79.54; H, 11.26.

EXAMPLE 46

To a solution of 46.7 ml. of pyridine in 1.3 l. of dichloromethane was added gradually 19.3 g. of chromium trioxide followed by a solution of 9.39 g. (0.027 mole) of 3-ol prepared as in Example 45 in 450 ml. of dichloromethane. The mixture was stirred for 30 minutes and the solution and a dichloromethane wash of the residue of chromium salts were washed with water, dried, passed over a short column of Florisil and concentrated to give a colorless crystalline residue. Recrystallization from dichloromethane-methanol gave 8.19 g. (88%) of 17β-propoxy-3'H-cyclopropa[16α,17α]5α-androstan-3-one. M.P. 113–115°. The analytical sample had M.P. 112.5–115°;

$\lambda_{max.}^{CHCl_3}$ 5.85μ

NMR in CDCl$_3$ δ ~3.5 (CH$_3$CH$_2$CH$_2$O, 2 H multiplet) and 1.03 (C–19 and C–18, 6 H singlet); [α]$_D^{25}$ +48.6° (CHCl$_3$, c.=0.916).

*Analysis.*—Calcd. for C$_{23}$H$_{36}$O$_2$ (percent): C, 80.18; H, 10.53. Found (percent): C, 80.12; H, 10.59.

EXAMPLE 47

A solution of sodium methoxide prepared from 1.12 g. (0.049 g.-atom) of sodium and 10.3 ml. of methanol was added all at once to a stirred solution of 4.0 g. (0.0116 mole) of 3-one prepared as in Example 46 in 80 ml. of pyridine and 13.3 ml. of ethyl formate. The reaction set solid almost immediately and was allowed to stand for 45 minutes. It was then diluted with water, made no longer basic with acetic acid and extracted with dichloromethane. The extract was dried and concentrated to give crude 2 - hydroxymethylene-17β-propoxy-3'H-cyclopropa [16α,17α]5α-androstan-3-one as a pale yellow solid. To a flask containing one-half of this was added 65 ml. of hot acetic acid and the flask was immediately immersed in an oil bath heated to 170°. Two minutes later a solution of 0.96 g. of hydroxylamine hydrochloride and 1.08 g. of sodium acetate in 12.2 ml. of water was added. In one minute the reaction began to boil and heating was continued under reflux for 5 minutes. The solution was immediately cooled in an ice bath and then poured into 1 l. of water. The resulting precipitate was collected by filtration, washed well with water and air dried. It was then dissolved in dichloromethane and adsorbed onto a column of 40 g. of silica gel. Elution with dichloromethane and 5% ether in dichloromethane gave crude product which on crystallization and recrystallization from dichloromethane-methanol gave 435 mg. (20%) of the analytical sample of 17β-propoxy-3'H-cyclopropa[16α,17α]5α-androstano[2,3-d]isoxazole as colorless crystals; M.P. 111–112°;

$\lambda_{max.}^{C_2H_5OH}$ 228 mμ (ε 5390)

NMR in CDCl$_3$ δ 8.00 (isoxazole C–H, 1 H singlet), 3.49 (CH$_3$CH$_2$CH$_2$O, 2,3H multiplet), 1.02 (C–19, 3 H singlet), 0.88 (CH$_3$CH$_2$CH$_2$O, 3 H triplet) and 0.73 (C–18, 3 H singlet); [α]$_D^{25}$ +70.3° (CHCl$_3$, c.=0.788).

*Analysis.*—Calcd. for C$_{24}$H$_{35}$NO$_2$ (percent): C, 78.00; H, 9.55; N, 3.79. Found (percent): C, 77.84; H, 9.75; N, 3.65.

EXAMPLE 48

17β - propoxy - 3'H - cyclopropa[16α,17α]5α - androstano[3,2-c] pyrazol was prepared starting with the 2-hydroxymethylene steroid prepared in Example 47 in a similar manner as that described in Example 30.

EXAMPLE 49

17β - propoxy - 3'H - cyclopropa[16α,17α]5α - androstano[3,2-c]isoxazole was prepared starting with the 2- hydroxymethylene steroid prepared in Example 47 in a similar manner as that described in Example 32.

EXAMPLE 50

A mixture of 10 ml. of dichloroethane 1.5 ml. of dimethylformamide, and 0.6 ml. of phosphorus oxychloride was stirred at room temperature for 20 minutes. To the thus-formed solution of a Vilamaeir reagent was added a solution of 1.00 g. (2.9 mmole) of 3'H-cyclopropa[16α,17α]5α-androstan-17β-ol-3-one acetate 3,3-cyclic ethylene ketal, prepared as in Example 16, in 5 ml. of dichloroethane. The reaction was stirred at room temperature for 75 minutes, washed with water, dried over sodium sulfate and concentrated to give a yellow oil. This was mixed with 15 ml. of methanol and 30 ml. of tetrahydrofuran and treated with 2.5 ml. of 3 N hydrochloric acid. The reaction was stirred at room temperature for 90 minutes, diluted with 150 ml. of water and stored at 4° overnight. Filtration of the resulting solid followed by recrystallization from dichloromethane-ethanol gave the analytical sample of 2-hydroxymethylene-3'H-cyclopropa[16α,17α] 5α-androstan-17β-ol-3-one acetate, M.P. 189.5–191°;

$\lambda_{max}^{CHCl_3}$ 6.30, 6.10 and 5.75μ; $\lambda_{max}^{C_2H_5OH}$ 282 mμ (ε 10,400) NMR in CDCl$_3$, δ 8.65 (2 CHOH or 2 CHO, 1 H singlet), 2.00 (OAc, 3 H singlet), 0.93 (C–19, 3 H singlet) and 0.75 (C–18, 3 H singlet); $[\alpha]_D^{25}$ +47.0° (CHCl$_3$, c.=0.869).

*Analysis.*—Calcd. for C$_{23}$H$_{32}$O$_4$ (percent): C, 74.16; H, 8.66. Found (percent): C, 73.67; H, 8.58.

EXAMPLE 51

17β - acetoxy - 3'H - cyclopropa[16α,17α]5α - androstano[2,3-d]isoxazole was prepared starting with the 2-hydroxymethylene steroid prepared in Example 50 in a similar manner as that described in Example 31.

EXAMPLE 52

17β - acetoxy - 3'H - cyclopropa[16α,17α]5α - androstano[3,2-c]isoxazole was prepared starting with the 2-hydroxymethylene steroid prepared in Example 50 in a similar manner as that described in Example 32.

EXAMPLE 53

Each of the test compounds in the table below was administered orally in sesame oil once daily at the indicated dosage for seven consecutive days to a group of ten castrated rats. On the eighth day the seminal vesicle, ventral prostate and levator ani were dissected out at autopsy and weighed on a torsion balance. The organ ratio (mg. organ/100 g. body weight) was calculated for each rat and the mean was determined for the group. The percent difference from the value for the control group was computed. The results are as follows:

COMPOUND

3'H-cyclopropa [16α, 17α]5α-androstan-17β-ol-3-one acetate

| Oral dose, mg./day | No. of rats | Percent difference vs. control | | |
|---|---|---|---|---|
| | | Seminal vesicle | Ventral prostate | Levator ani |
| 0.5 | 9 | 105 | 228 | 12 |
| 1 | 9 | 222 | 321 | 29 |
| 2 | 10 | 270 | 391 | 34 |
| 4 | 10 | 487 | 626 | 70 |

COMPOUND

17β-hydroxy-3'H-cyclopropa[16α, 17α]5α-androst 1-en-3-one acetate

| Oral dose, mg./day | No. of rats | Percent difference vs. control | | |
|---|---|---|---|---|
| | | Seminal vesicle | Ventral prostate | Levator ani |
| 0.5 | 10 | 80 | 117 | 15 |
| 1 | 9 | 163 | 166 | 38 |
| 2 | 10 | 239 | 319 | 74 |
| 4 | 10 | 476 | 565 | 113 |

COMPOUND

17β-hydroxy-3'H-cyclopropa [16α, 17α]androst-4-en-3-one acetate

| Oral dose, mg./day | No. of rats | Percent difference vs. control | | |
|---|---|---|---|---|
| | | Seminal vesicle | Ventral prostate | Levator ani |
| 1 | 9 | 197 | 283 | 35 |

COMPOUND

17β-methoxy-3'H-cyclopropa[16α, 17α]5α-androstano[2,3-d] isoxazole

| Oral dose, mg./day | No. of rats | Percent difference vs. control | | |
|---|---|---|---|---|
| | | Seminal vesicle | Ventral prostate | Levator ani |
| 0.5 | 10 | 44 | 30 | 34 |
| 1 | 9 | 82 | 76 | 57 |
| 2 | 10 | 156 | 225 | 80 |
| 4 | 9 | 290 | 257 | 86 |

COMPOUND

3'H-cyclopropa[16α, 17α]5α-androstane-3β,17β-diol 17-acetate-3-benzoate

| Oral dose, mg./day | No. of rats | Percent difference vs. control | | |
|---|---|---|---|---|
| | | Seminal vesicle | Ventral prostate | Levator ani |
| 1 | 9 | 85 | 196 | 30 |

COMPOUND

17β-ethoxy-3'H-cyclopropa[16α, 17α]5α-androstan-3-one

| Oral dose, mg./day | No. of rats | Percent difference vs. control | | |
|---|---|---|---|---|
| | | Seminal vesicle | Ventral prostate | Levator ani |
| 1 | 9 | 147 | 387 | 34 |

COMPOUND

17β-ethoxy-3'H-cyclopropa[16α, 17α]5α-androstano[2, 3-d]-isoxazole

| Oral dose, mg./day | No. of rats | Percent difference vs. control | | |
|---|---|---|---|---|
| | | Seminal vesicle | Ventral prostate | Levator ani |
| 1 | 10 | 73 | 164 | 64 |

COMPOUND

17β-methoxy-3'H-cyclopropa [16α, 17α]5α-androstan-3-one

| Oral dose, mg./day | No. of rats | Percent difference vs. control | | |
|---|---|---|---|---|
| | | Seminal vesicle | Ventral prostate | Levator ani |
| 1 | 9 | 173 | 289 | 14 |

COMPOUND

3'H-cyclopropa [16α, 17α]5α-androstan-17β-ol-3-one propionate

| Oral dose, mg./day | No. of rats | Percent difference vs. control | | |
|---|---|---|---|---|
| | | Seminal vesicle | Ventral prostate | Levator ani |
| 1 | 9 | 226 | 389 | 5 |

EXAMPLE 54

3'H-cyclopropa[16α,17α]estra - 1,3,5(10) - trien - 3, 17β-diol diacetate was administered orally in sesame oil once daily at the indicated dosage for three consecutive days to a group of ten immature female rats (40–50 g.). On the fourth day, the uteri were removed at autopsy and weighed. The organ ratio (mg. organ/100 g. body weight) was calculated for each rat, and the mean was determined for the group. The percent difference from the value for the control group was computed. The results are as follows:

| Oral dose μg./day | Percent difference vs. control |
|---|---|
| 1 | +78 |
| 2 | +113 |
| 4 | +125 |
| 10 | +131 |

| Oral dose µg./day | Percent difference vs. control |
|---|---|
| 20 | +179 |
| 40 | +205 |
| 100 | +208 |
| 200 | +269 |
| 400 | +298 |
| 1000 | +340 |

What is claimed is:

1. A compound of the formula

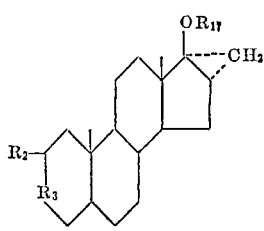

wherein $R_{17}$ is hydrogen, lower alkyl or acyl; and $R_2$ and $R_3$ taken together with carbon atom 2 of the steroid nucleus form a five-membered heteroaromatic ring selected from the group consisting of isoxazole and pyrazole wherein one heteroatom is attached to carbon atom 3, which may additionally contain $\Delta^4$- or $\Delta^{4,6}$-unsaturation.

2. The compound of calim 1 which is 17β-acetoxy-3'H-cyclopropa[16α,17α]5α-androstano[2,3-d]isoxazole.

3. The compound of claim 1 which is 17β-acetoxy-3'H-cyclopropa[16α,17α]5α-androstano[3,2-c]isoxazole.

4. The compound of claim 1 which is 17β-methoxy-3'H-cyclopropa[16α,17α]5α-androstano[3,2-c]pyrazole.

5. The compound of claim 1 which is 17β-methoxy-3'H-cyclopropa[16α,17α]5α-androstano[2,3-d]isoxazole.

6. The compound of claim 1 which is 17β-methoxy-3'H-cyclopropa[16α,17α]5α-androstano[3,2-c]isoxazole.

7. The compound of claim 1 which is 17β-ethoxy-3'H-cyclopropa[16α,17α]5α-androstan[2,3-d]isoxazole.

8. The compound of claim 1 which is 17β-ethoxy-3'H-cyclopropa[16α,17α]5α-androstano[3,2-c]pyrazole.

9. The compound of claim 1 which is 17β-ethoxy-3'H-cyclopropa[16α,17α]5α-androstano[3,2-c]isoxazole.

10. The compound of claim 1 which is 17β-propoxy-3'H-cyclopropa[16α,17α]5α-androstano[2,3-d]isoxazole.

11. The compound of claim 1 which is 17β-propoxy-3'H-cyclopropa[16α,17α]5α-androstano[3,2-c]pyrazole.

12. The compound of claim 1 which is 17β-propoxy-3'H-cyclopropa[16α,17α]5α-androstano[3,2-c]isoxazole.

13. A compound of the formula

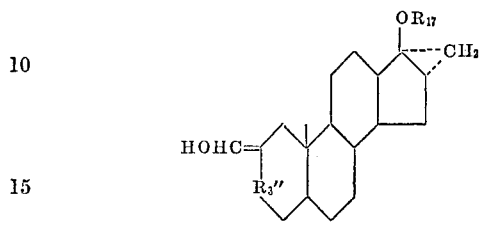

wherein $R_{17}$ is hydrogen, lower alkyl or acyl and $R_3''$ is 3-keto, 3-keto-$\Delta^4$ or 3-keto-$\Delta^{4,6}$, and its tautomers.

14. The compound of claim 13 which is 2-hydroxymethylene - 17β-ethoxy - 3'H - cyclopropa[16α,17α]5α-androstan-3-one.

15. The compound of claim 13 which is 2-hydroxymethylene - 17β-ethoxy - 3'H - cycloprop[16α,17α]5α-androstan-3-one.

16. The compound of claim 13 which is 2-hydroxymethylene - 17β-propoxy - 3'H - cyclopropa[16α,17α]5α-androstan-3-one.

17. The compound of claim 13 which is 2-hydroxymethylene - 1β-acetoxy - 3'H - cyclopropa[16α,17α]5α-androstan-3-one.

References Cited

Knox et al., Jour. Amer. Chem. Soc. (1963), vol. 85, pp. 1851–1854, relied on.

Pappo, et al., Jour. Amer. Chem. Soc. (1956), pp. 6347–6348, relied on.

ELBERT L. ROBERTS, Primary Examiner

U.S. Cl. X.R.

260—239.55 R, 397.4, 397.5; 424—241